US011133571B2

(12) United States Patent
Park et al.

(10) Patent No.: US 11,133,571 B2
(45) Date of Patent: Sep. 28, 2021

(54) ELECTRONIC APPARATUS AND CONTROL METHOD THEREFOR

(71) Applicant: Samsung Electronics Co., Ltd., Gyeonggi-do (KR)

(72) Inventors: Sung-Chul Park, Seoul (KR); Yeon-Woo Kim, Gyeonggi-do (KR); Jong-Hyuk Kim, Gyeonggi-do (KR); Seung-Gil Jeon, Gyeonggi-do (KR); Young-Ju Kim, Gyeonggi-do (KR); Chae-Man Lim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/766,249

(22) PCT Filed: Oct. 5, 2016

(86) PCT No.: PCT/KR2016/011115
§ 371 (c)(1),
(2) Date: Apr. 5, 2018

(87) PCT Pub. No.: WO2017/061756
PCT Pub. Date: Apr. 13, 2017

(65) Prior Publication Data
US 2018/0294547 A1 Oct. 11, 2018

(30) Foreign Application Priority Data
Oct. 5, 2015 (KR) ........................ 10-2015-0139587

(51) Int. Cl.
*H01Q 1/24* (2006.01)
*H01Q 21/00* (2006.01)
(Continued)

(52) U.S. Cl.
CPC ............. *H01Q 1/241* (2013.01); *H01Q 1/243* (2013.01); *H01Q 1/44* (2013.01); *H01Q 3/24* (2013.01);
(Continued)

(58) Field of Classification Search
CPC .......... H01Q 1/24; H01Q 1/241; H01Q 1/242; H01Q 1/243; H01Q 1/245; H01Q 5/30;
(Continued)

(56) References Cited

U.S. PATENT DOCUMENTS 8,947,302 B2    2/2015  Caballero et al.
9,172,441 B2 *  10/2015 Granger-Jones ..... H04B 7/0404
(Continued)

FOREIGN PATENT DOCUMENTS

CN      102544753        7/2012
EP      2 810 382        12/2014
(Continued)

OTHER PUBLICATIONS

European Search Report dated Oct. 9, 2018 issued in counterpart application No. 16853872.6-1205, 7 pages.
(Continued)

*Primary Examiner* — Andrea Lindgren Baltzell
*Assistant Examiner* — Patrick R Holecek
(74) *Attorney, Agent, or Firm* — The Farrell Law Firm, P.C.

(57) ABSTRACT

An electronic apparatus, according to various embodiments of the present invention, comprises: a first antenna of a first bandwidth; a second antenna of a second bandwidth which partially overlaps with the first bandwidth; a third antenna of the first bandwidth; a fourth antenna of the second bandwidth; a transmission/reception path corresponding to each of a plurality of bandwidths; a reception path corresponding to each of the plurality of bandwidths; and a path formation
(Continued)

unit which forms a path such that any one of the first antenna and the third antenna is connected to the transmission/reception path, the other of the first antenna and the third antenna is connected to the reception path, and any one of the second antenna and the fourth antenna is connected to the transmission/reception path, and the other of the second antenna and the fourth antenna is connected to the reception path.

8 Claims, 30 Drawing Sheets

(51) Int. Cl.

| | | |
|---|---|---|
| *H04W 88/06* | (2009.01) | |
| *H01Q 5/50* | (2015.01) | |
| *H04B 7/06* | (2006.01) | |
| *H04B 7/08* | (2006.01) | |
| *H01Q 3/24* | (2006.01) | |
| *H01Q 9/42* | (2006.01) | |
| *H01Q 1/44* | (2006.01) | |
| *H04B 1/00* | (2006.01) | |

(52) U.S. Cl.
CPC .............. *H01Q 5/50* (2015.01); *H01Q 9/42* (2013.01); *H01Q 21/0006* (2013.01); *H04B 1/0064* (2013.01); *H04B 7/0602* (2013.01); *H04B 7/0802* (2013.01); *H04W 88/06* (2013.01)

(58) Field of Classification Search
CPC .......... H01Q 5/307; H01Q 5/342; H01Q 5/35; H01Q 5/40; H01Q 5/48; H01Q 5/50; H01Q 21/0006; H01Q 21/28; H01Q 21/30; H04W 88/06
See application file for complete search history.

(56) References Cited

U.S. PATENT DOCUMENTS

| | | |
|---|---|---|
| 2008/0042777 A1 | 2/2008 | Lee et al. |
| 2011/0012795 A1 | 1/2011 | Jin et al. |
| 2011/0319038 A1 | 12/2011 | Park et al. |
| 2012/0112970 A1 | 5/2012 | Caballero et al. |
| 2013/0203364 A1 | 8/2013 | Darnell et al. |
| 2013/0249767 A1 | 9/2013 | Ishizuka et al. |
| 2014/0105079 A1* | 4/2014 | Bengtsson ............ H04B 1/005 370/297 |
| 2014/0227982 A1 | 8/2014 | Granger-Jones et al. |
| 2015/0091763 A1 | 4/2015 | Tong et al. |
| 2015/0105120 A1 | 4/2015 | Lim |
| 2017/0256843 A1* | 9/2017 | Hu .................. H01Q 1/243 |

FOREIGN PATENT DOCUMENTS

| | | |
|---|---|---|
| JP | 5429409 | 12/2013 |
| KR | 1020080015569 | 2/2008 |
| KR | 1020110008605 | 1/2011 |
| KR | 1020120001063 | 1/2012 |
| KR | 1020130028572 | 3/2013 |
| KR | 1020140116553 | 10/2014 |
| KR | 1020150035445 | 4/2015 |
| KR | 1020150043165 | 4/2015 |
| WO | WO 2013/135872 | 9/2013 |

OTHER PUBLICATIONS

PCT/ISA/210 Search Report issued on PCT/KR2016/011115 (pp. 4).
Chinese Office Action dated Nov. 23, 2020 issued in counterpart application No. 201680058586.4, 10 pages.
Korean Office Action dated Aug. 9, 2021 issued in counterpart application No. 10-2015-0139587, 10 pages.

* cited by examiner

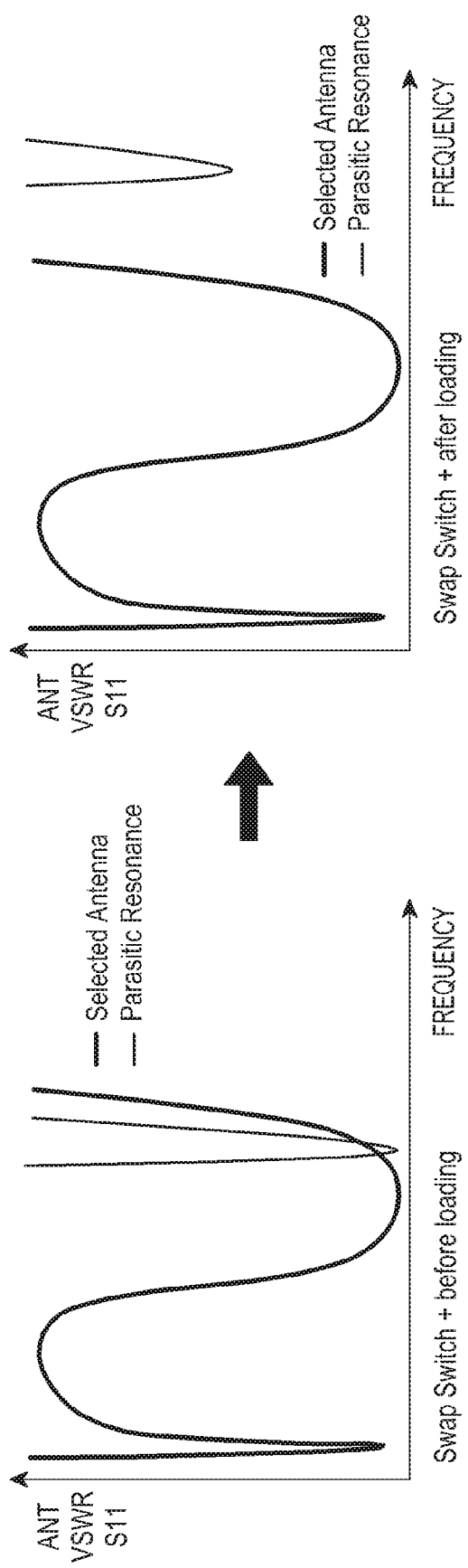

ELECTRONIC APPARATUS AND CONTROL METHOD THEREFOR

PRIORITY

This application is a National Phase Entry of PCT International Application No. PCT/KR2016/011115 filed on Oct. 5, 2016, and claims priority to Korean Patent Application No. 10-2015-0139587 filed on Oct. 5, 2015, the contents of each of which are incorporated herein by reference.

BACKGROUND

1. Field

Various embodiments relate to electronic devices and methods for controlling the same.

2. Description of the Related Art

Recently under development are a variety of electronic devices, such as smartphones or tablet PCs.

Such electronic devices are equipped with LTE (800 MHz, 1.8 GHz, 2.1 GHz, 2.6 GHz), 3G (1.8 GHz, 2.1 GHz), WiMAX (2.3 GHz, 3.3 GHz, 5.7 GHz), wireless LAN (2.4 GHz), Bluetooth (2.4 GHz), or UWB (3.1-10.6 GHz), along with multiple per-frequency band antennas.

In conventional electronic devices with multiple antennas, a transmission line is connected to each antenna.

An electronic device comes with two or more multi-band antennas to raise the reliability of communication signals and a diversity antenna to mitigate multi-path fading in the mobile communication system.

Meanwhile, inter-antenna interference should be reduced to increase the quality of communication signals of antennas equipped in an electronic device.

SUMMARY

Conventionally, as electronic devices have more antennas, more transmission lines are wired for the electronic devices. Further, the conventional art needs a plurality of switches for switching among multiple antennas, with the result of posing limitations on the wiring and deployment of parts in the electronic device.

Since communication signals of antennas are vulnerable to noise, equipping multiple antennas in the electronic device requires antenna signal lines on the PCB to be isolated from other signal lines in design or considering use of coaxial cables. In designing isolation between the antenna signal lines on the PCB and the other signal lines, the plurality of antenna signal lines typically take up too much space of the PCB. This significantly limits the wiring and parts layout on the PCB. The use of coaxial cables which occupy more space in the electronic device may cause limitations in mounting parts and a cost rise.

To raise communication signal quality for antennas equipped in the electronic device, it is critical to reduce mutual interference between antennas or between transmission/reception signals.

According to various embodiments, there are provided an electronic device that may apply a plurality of antennas to a small number of transmit lines and a method for controlling the same.

According to various embodiments, there are provided an electronic device that may reduce the number of antennas upon switching among a plurality of antennas in an antenna device and a method for controlling the same.

According to various embodiments, there are provided an electronic device capable of selectively connecting a plurality of antennas by way of switches to reduce inter-antenna or inter-transmission/reception signal interference.

According to an embodiment, an electronic device may comprise an antenna module including a plurality of antennas corresponding to a plurality of bands, an RF signal processor configured to process signals of the plurality of bands, a single transmission line having an end connected with the RF signal processor and configured to transmit the signals of the plurality of bands between the RF signal processor and the antenna module, and a signal distribution coupler connected with another end of the single transmission line and configured to form signal paths corresponding to the plurality of antennas of the antenna module.

According to an embodiment, an electronic device may comprise a first antenna of a first band, a second antenna of a second band partially overlapping the first band, a third antenna of the first band, and a fourth antenna of the second band, a transmission/reception path corresponding to each of a plurality of bands, a reception path corresponding to each of the plurality of bands, and a path forming unit configured to form a path to connect any one of the first antenna and the third antenna to the transmission/reception path, the other of the first antenna and the third antenna to the reception path, any one of the second antenna and the fourth antenna to the transmission/reception path, and the other of the second antenna and the fourth antenna to the reception path.

According to an embodiment, an electronic device may comprise an antenna module including first to eighth antennas, a transmission/reception path including a first front end corresponding to a first band and a second front end corresponding to a second band, a reception path including a third front end corresponding to the first band and a fourth front end corresponding to the fourth band, and a main switch configured to connect one selected from among the first front end, the second front end, the third front end, and the fourth front end to each of a first sub switch, a second sub switch, a third sub switch, and a fourth sub switch, wherein the first sub switch, the second sub switch, the third sub switch, and the fourth sub switch are connected to each of two antennas of the same band in the antenna module, allowing one of the two antennas each connected with the first sub switch, the second sub switch, the third sub switch, and the fourth sub switch to selectively connect to the main switch.

According to an embodiment, a method for controlling an electronic device may comprise receiving a signal received through one or more of the plurality of antennas, performing a diversity operation upon receiving the signal through the plurality of antennas, measuring an electric field strength of the received signal, comparing the electric field strength with a threshold, and adding a reception antenna or maintaining the number of reception antennas according to the comparison.

According to an embodiment, a method for controlling an electronic device may comprise identifying a transmit power of the electronic device, if the transmit power reaches a designated reference value or a command to increase the transmit power is identified while the transmit power reaches the designated reference value, comparing performances of the plurality of antennas using a previously measured offset and a received electric field of each of the plurality of antennas, and determining one antenna to perform transmission of a signal according to a result of the comparison.

According to various embodiments, in an electronic device and method for controlling the same, a plurality of antennas may be applied to a small number of transmission lines. Upon switching among a plurality of antennas, the number of switches may be reduced. Antennas may selectively be connected via switches, reducing interference between the antennas or between transmission/reception signals. This leads to efficiency in mounting parts and cost savings upon manufacturing electronic devices. This may also impart better communication performance to electronic devices.

BRIEF DESCRIPTION OF THE DRAWINGS

FIG. 22 is a graph illustrating an example of shifting to a frequency domain not supported by an adjacent antenna or a modification according to various embodiments;

DETAILED DESCRIPTION

Figure 1:
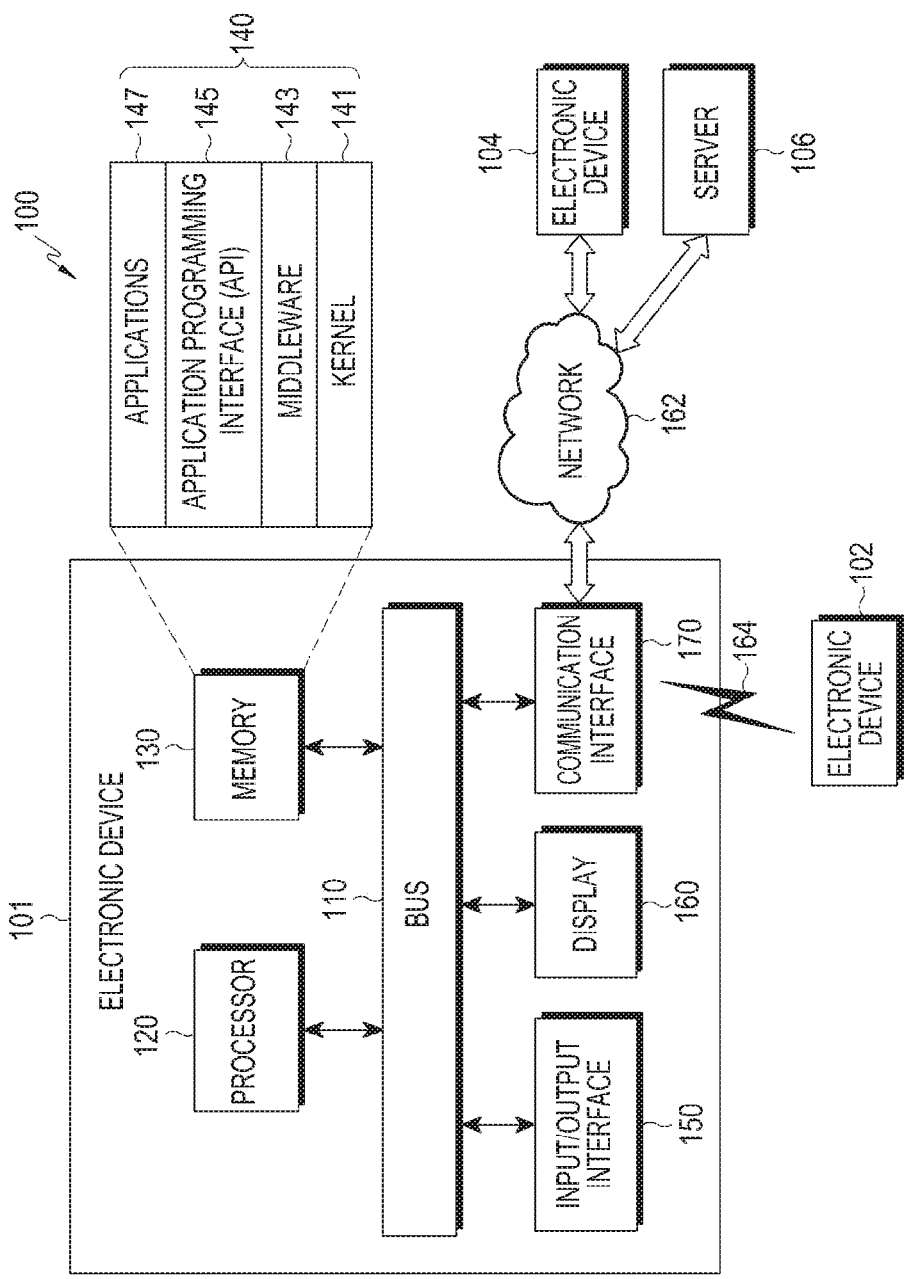
FIG. 1 illustrates a network environment according to various embodiments.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to various embodiments, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Referring to FIG. 1, according to an embodiment of the present disclosure, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of the electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, or near-field communication (NFC). Further, the wireless communication may include, e.g., satellite communication. The satellite communication may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
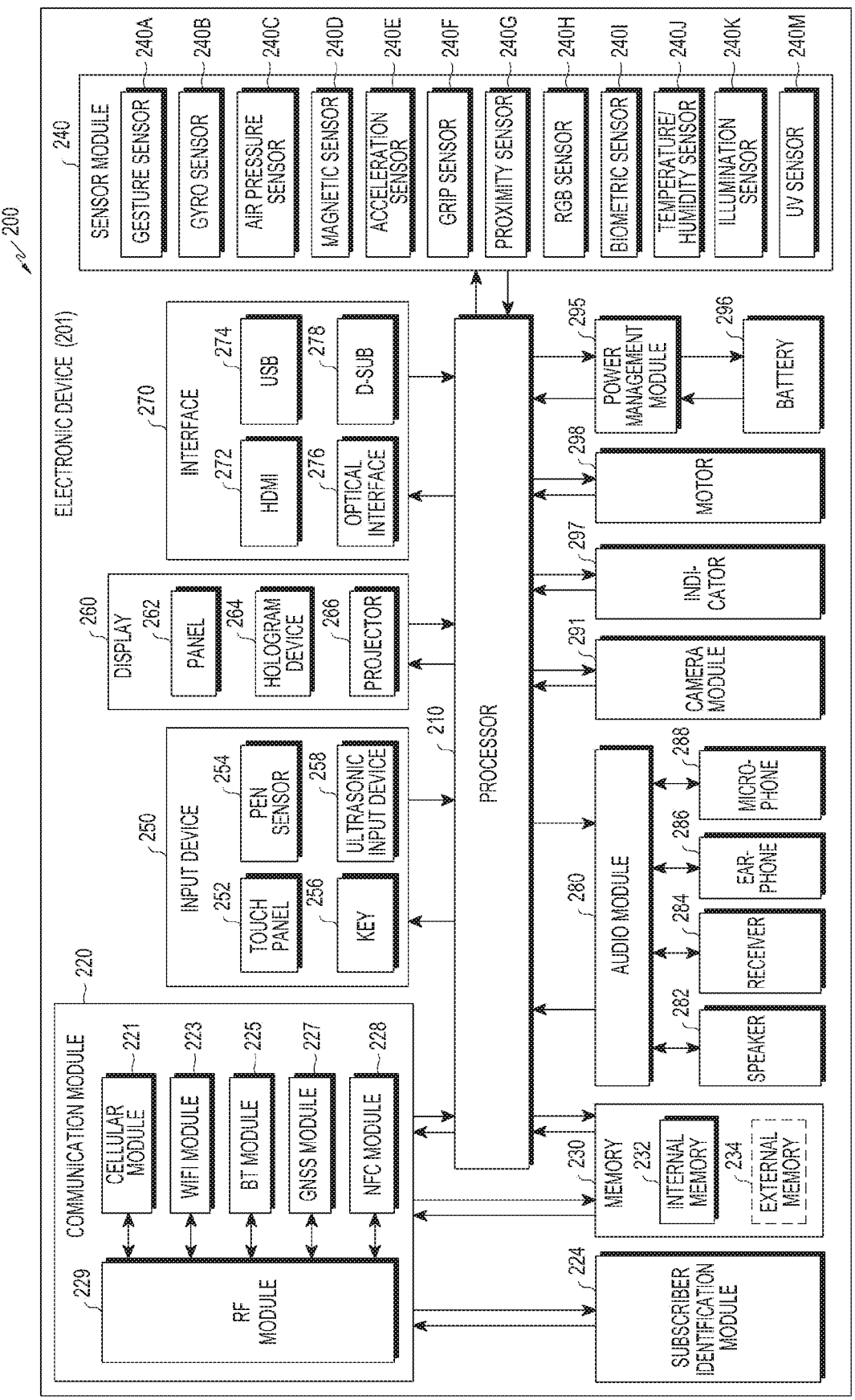
FIG. 2 is a block diagram illustrating an electronic device according to various embodiments.

FIG. 2 is a block diagram illustrating an electronic device 201 according to various embodiments. An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. According to an embodiment, the cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. According to some embodiments, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 1210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. According to an embodiment, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
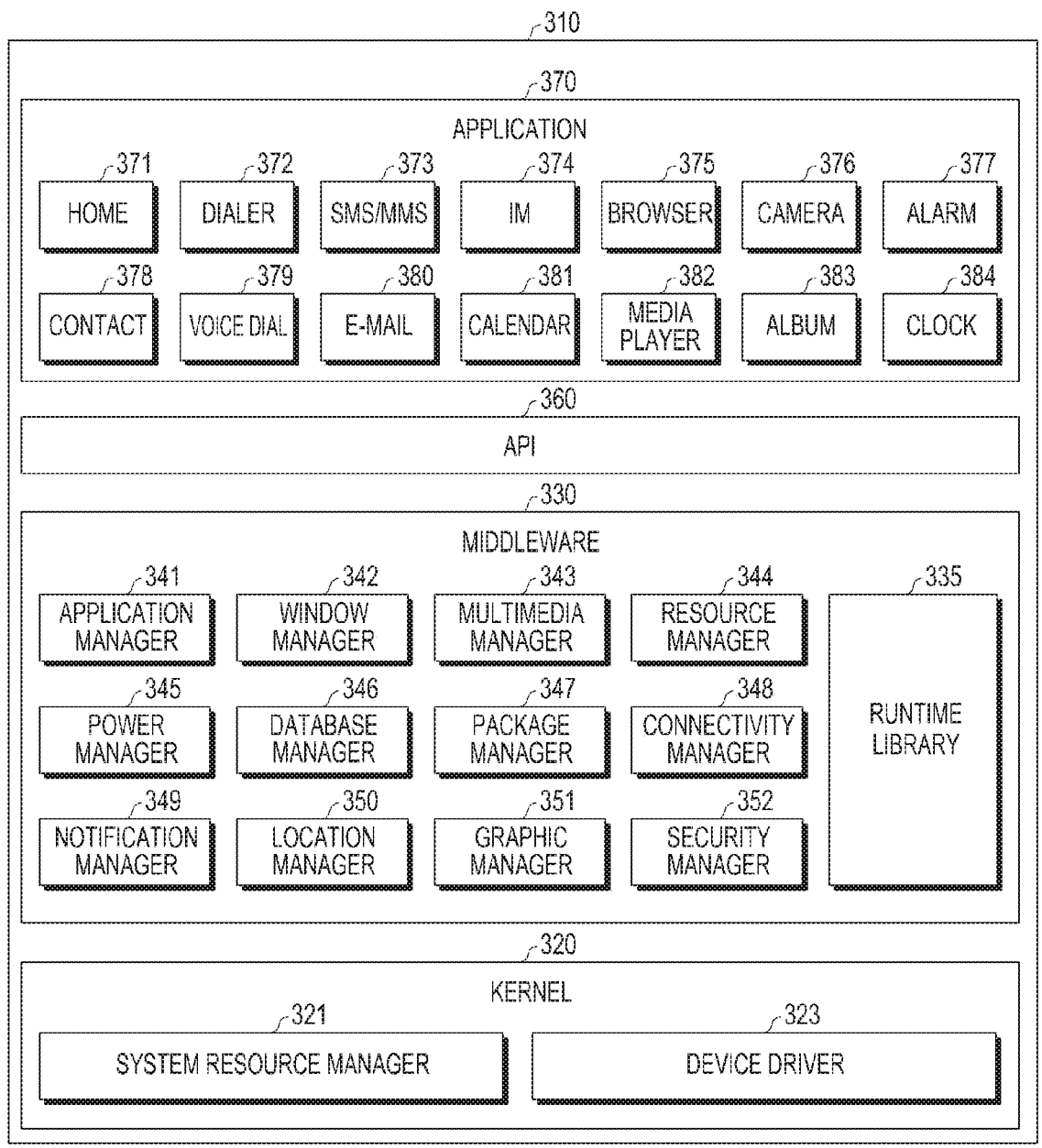
FIG. 3 is a block diagram illustrating a program module according to an embodiment of the present disclosure.

FIG. 3 is a block diagram illustrating a program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment, the application 370 may include an application received from the external electronic device (e.g., the server 106 or electronic devices 102 and 104). According to an embodiment, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof At least a part of the programming module 310 may be implemented (e.g., executed) by e.g., a processor (e.g., the processor 210). At least a part of the program module 310 may include e.g., a module, program, routine, set of commands, process, or the like for performing one or more functions.

Figure 4:
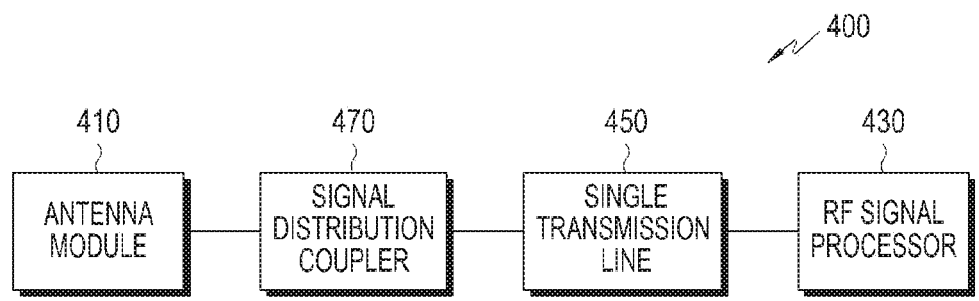
FIG. 4 is a block diagram illustrating an electronic device including a plurality of antennas according to various embodiments.

FIG. 4 is a block diagram illustrating an electronic device including a plurality of antennas according to various embodiments.

Referring to FIG. 4, an electronic device 400 (e.g., the electronic device 101) may include an antenna module 410, an RF signal processor 430, a single transmission line 450, and a signal distribution coupler 470.

The antenna module 410 may include a plurality of antennas corresponding to a plurality of bands. For example, the antenna module 410 may include a first antenna (not shown) corresponding to a first band and a second antenna (not shown) corresponding to a second band.

The RF signal processor 430 may process signals of the plurality of bands.

The single transmission line 450 may have an end connected with the RF signal processor 430 and transfer signals of the plurality of bands between the RF signal processor 430 and the antenna module 410. The single transmission line 450 may be a coaxial cable.

The signal distribution coupler 470 may be connected with the other end of the single transmission line 450 and may produce signal paths corresponding to the plurality of antennas of the antenna module 410. For example, the signal distribution coupler 470 may include at least one passive element (not shown). Further, the signal distribution coupler 470 may add a transmission line (not shown).

According to various embodiments, the RF signal processor 430 may include an RF circuit (not shown). Further, the RF signal processor 430 may further include a diplexer having a first and second port connected with the RF circuit and a common port connected with the other end of the single transmission line 450.

For example, the signal distribution coupler 470 may include a first bandpass filter (not shown) having an end connected with a first antenna of the antenna module 410 and the other end connected with the other end of the single transmission line 450, filtering signals other than the signal of the first band corresponding to the first antenna. The signal distribution coupler 470 may further include a second bandpass filter (not shown) having an end connected with a second antenna of the antenna module 410 and the other end connected with the other end of the single transmission line 450, filtering signals other than the signal of the second band corresponding to the second antenna.

For example, the signal distribution coupler 470 may include a diplexer having a common port connected with the other end of the single transmission line 450, a first port connected with the first antenna of the antenna module 410, and a second port connected with the second antenna of the antenna module 410.

According to various embodiments, the RF signal processor 430 may include an RF circuit and a triplexer (not shown) having a first port, a second port, and a third port connected with the RF circuit and a common port connected with the other end of the single transmission line 450.

For example, the signal distribution coupler 470 may include a first, second, third, and fourth bandpass filter (not shown). The first bandpass filter may filter signals of the first band and have an end connected with the first antenna of the first band in the antenna module 410 and the other end connected with the other end of the second bandpass filter. The second bandpass filter filters signals of the second band and has an end connected to the third bandpass filter. The third bandpass filter may filter signals of the third band and have an end connected with the second antenna of the third band in the antenna module 410 and the other end connected with the other end of the fourth bandpass filter. An end of the fourth bandpass filter may be connected with the third antenna of the fourth band in the antenna module 41. The fourth bandpass filter may filter signals of the fourth band. The first, second, third, and fourth bands may include frequency bands overlap each other.

According to various embodiments, the electronic device 400 may further include a switch enabling connection and disconnection between the antennas of the first and second bands among the plurality of bands according to control signals.

Figure 5:
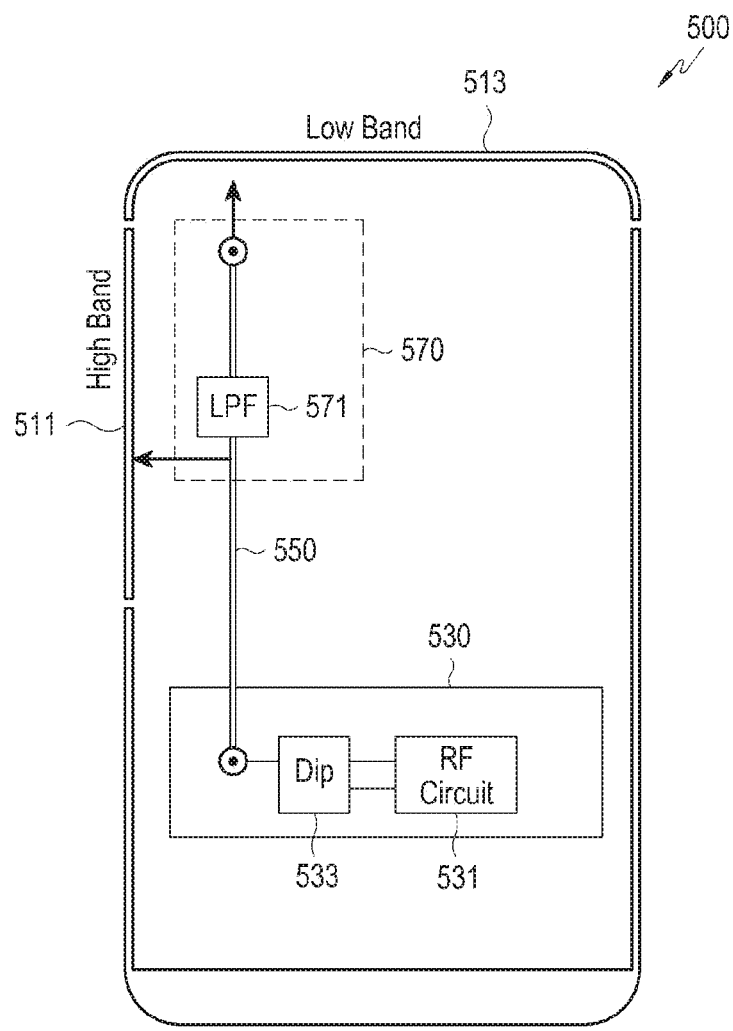
FIG. 5 is a circuit diagram illustrating an electronic device including a plurality of antennas according to various embodiments.

FIG. 5 is a circuit diagram illustrating an electronic device including a plurality of antennas according to various embodiments.

Referring to FIG. 5, an electronic device 500 (e.g., the electronic device 400) may connect two antennas, i.e., a first antenna 511 and a second antenna 513, with a signal distribution coupler 570 and input (or output) the respective signals of the first antenna 511 and the second antenna 513 via a single transmission line 550 to an RF circuit 531.

The electronic device 500 may include the first antenna 511, the second antenna 513, an RF signal processor 530, the single transmission line 550, and the signal distribution coupler 570.

The first antenna 511 and the second antenna 513 may be antennas configured to operate on a first band and a second band, respectively. The first antenna 511 and the second antenna 513 may be part of a metallic bezel (metal housing). For example, the electronic device 500 may include a metallic bezel. The metallic bezel may include at least one separator, and unit bezel parts into which the bezel is divided by the separator may be utilized as the first antenna 511 and the second antenna 513. Further, for example, the first band may be a high band, and the second band may be a low band. Further, the RF signal processor 530 may include the RF circuit 531 and a diplexer 533. The single transmission line 550 may be a coaxial cable. Further, the signal distribution coupler 570 may include a low pass filter (LPF) 571.

For the first antenna 511, the second antenna 513, and the RF circuit 531 to communicate signals through the single transmission line 550, an end of the single transmission line 550 may be connected to the common port of the diplexer 533, and each port of the diplexer 533 may be connected to the RF circuit 531. The other end of the single transmission line 550 may be connected with the first antenna 511. For example, a line connected with the single transmission line 550 may be connected with a feeding line of the first antenna 511. The other end of the single transmission line 550 may be connected with the LPF 571 connected with the second antenna 513, preventing the LPF 571 from transmitting high-band antenna signals through the line connected with the low-band antenna. Further, the second antenna 513 and the LPF 571 may be connected with each other through, e.g., a coaxial cable.

By the above-described configuration, the RF circuit 531 may use the single transmission line 550 to transmit signals corresponding to the first band to the first antenna 511 or transmit signals corresponding to the second band to the second antenna 513. Further, the RF circuit 531 may receive signals corresponding to the first band from the first antenna 511 or antenna signals corresponding to the second band from the second antenna 513. Signals input (or output) to the common port of the diplexer 533 may include a signal corresponding to the first band and a signal corresponding to the second band, and the single transmission line 550 connected to the common port of the diplexer 533 may transmit the two signals.

Figure 6:
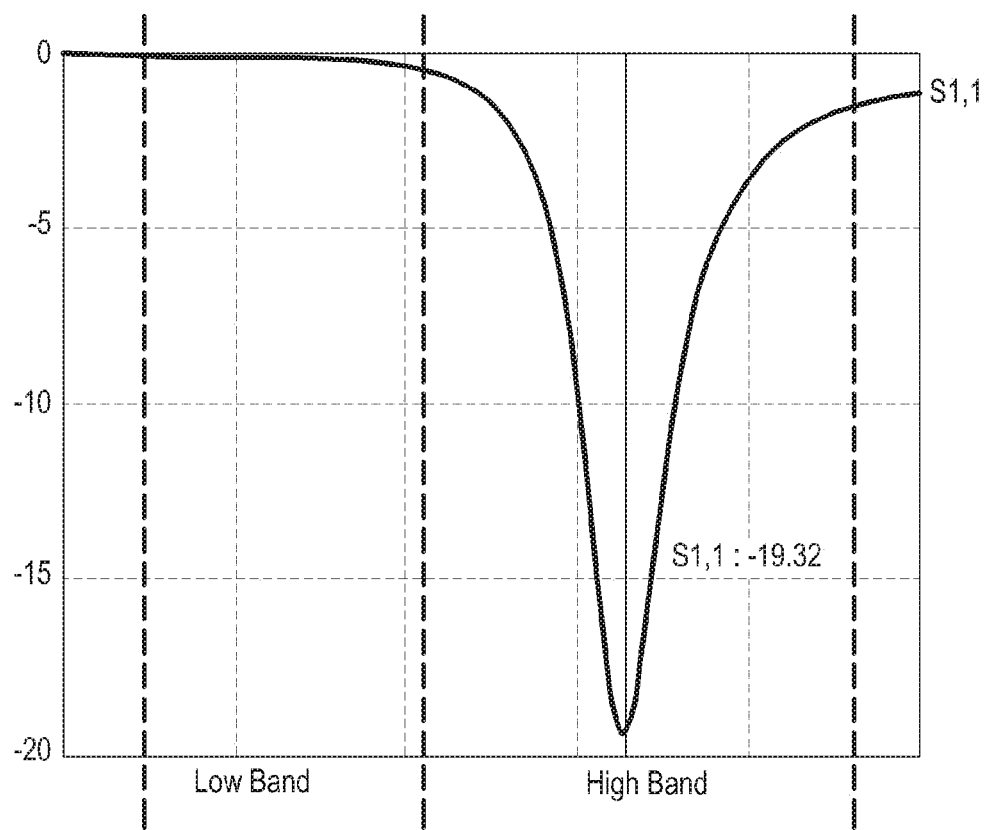
FIG. 6 is a graph illustrating a reflection loss S 11 of a high-band antenna.

FIG. 6 is a graph illustrating a reflection loss S11 of a high-band antenna. By the resonance characteristics shown in FIG. 6, high-band antenna signals are radiated from the high-band antenna. Since low-band S11 characteristics are similar to low-band (STOP) characteristics of the high pass filter (HPF), low-band antenna signals are transmitted to the low-band antenna without radiating from the high-band antenna.

FIG. 7 is a circuit diagram illustrating an electronic device including a plurality of antennas according to various embodiments.

Figure 7A:
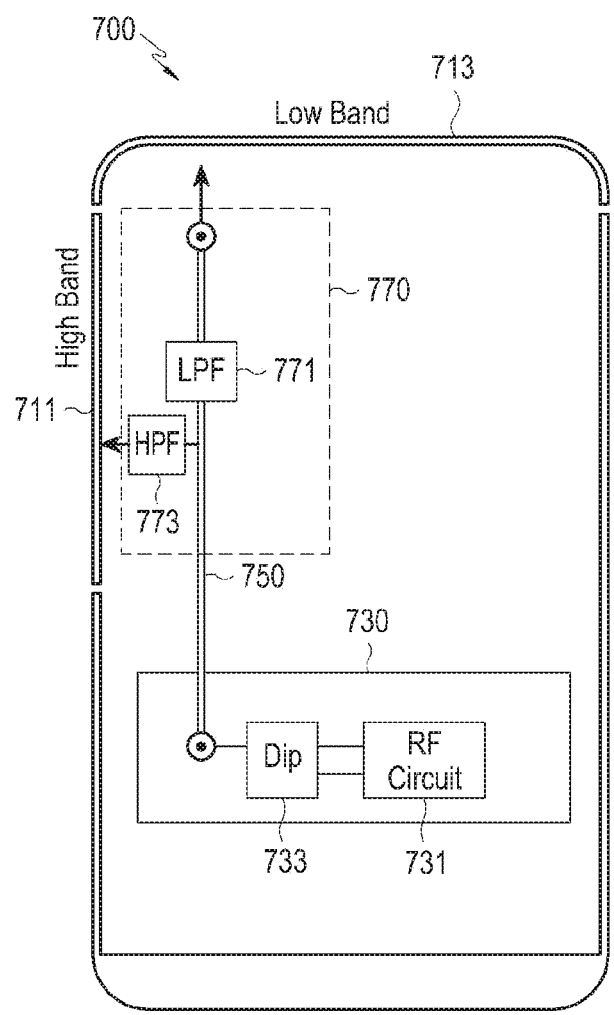
FIG. 7 is a circuit diagram illustrating an electronic device including a plurality of antennas according to various embodiments.

Referring to FIG. 7(a), an electronic device 700 (e.g., the electronic device 400) may add a HPF 773 at the front end of the feeding part of the first antenna 511 in addition to the electronic device 500 of FIG. 5 so as to secure stable performance.

Referring to FIG. 7(a), the electronic device 700 may include the first antenna 711, the second antenna 713, an RF signal processor 730, the single transmission line 750, and the signal distribution coupler 770. The first antenna 711 and the second antenna 713 may be antennas configured to operate on a first band (e.g., a high band) and a second band (e.g., a low band), respectively. The first antenna 711 and the second antenna 713 may be part of a metallic bezel (metal housing). For example, the electronic device 700 may include a metallic bezel. The metallic bezel may include at least one separator, and unit bezel parts into which the bezel is divided by the separator may be utilized as the first antenna 711 and the second antenna 713. Further, the RF signal processor 730 may include the RF circuit 731 and a diplexer 733. The signal distribution coupler 770 may include an LPF 771 and an HPF 773.

Referring to FIG. 7(a), one end of the single transmission line 750 may be connected with one end of the LPF 771 and one end of the HPF 773, and the other end of the single transmission line 750 may be connected with the common port of the diplexer 733. The RF circuit 731 may be connected with the first port and second port of the diplexer 733. The other end of the LPF 771 may be connected with the second antenna 713, and the other end of the HPF 773 may be connected with the first antenna 711. The other end of the LPF 771 and the second antenna 713 may be connected with each other via, e.g., a coaxial cable.

Figure 7B:
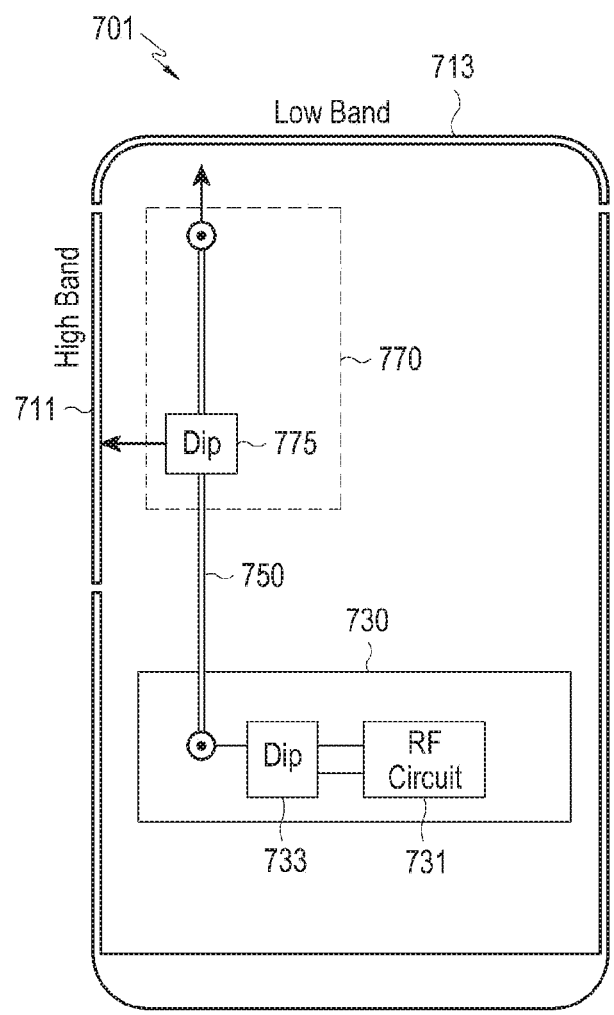

Meanwhile, instead of the LPF 771 and HPF 773 of the electronic device 700 of FIG. 7(a), the diplexer 775 may be applied to configure the electronic device 701 as shown in FIG. 7(b). For example, as shown in FIG. 7(b), the diplexer 775-applied electronic device 701 may have one end of the single transmission line 750 connected with the common port of the diplexer 775 and the first port and second port of the diplexer 775 connected with the first antenna 711 and the second antenna 713, respectively. The second port of the diplexer 775 and the second antenna 713 may be connected with each other via, e.g., a coaxial cable. Meanwhile, the relationship in connection among the other components of the electronic device 701 of FIG. 7(b) is the same as the electronic device 700 of FIG. 7(a), and no detailed description thereof is presented.

Figure 8:
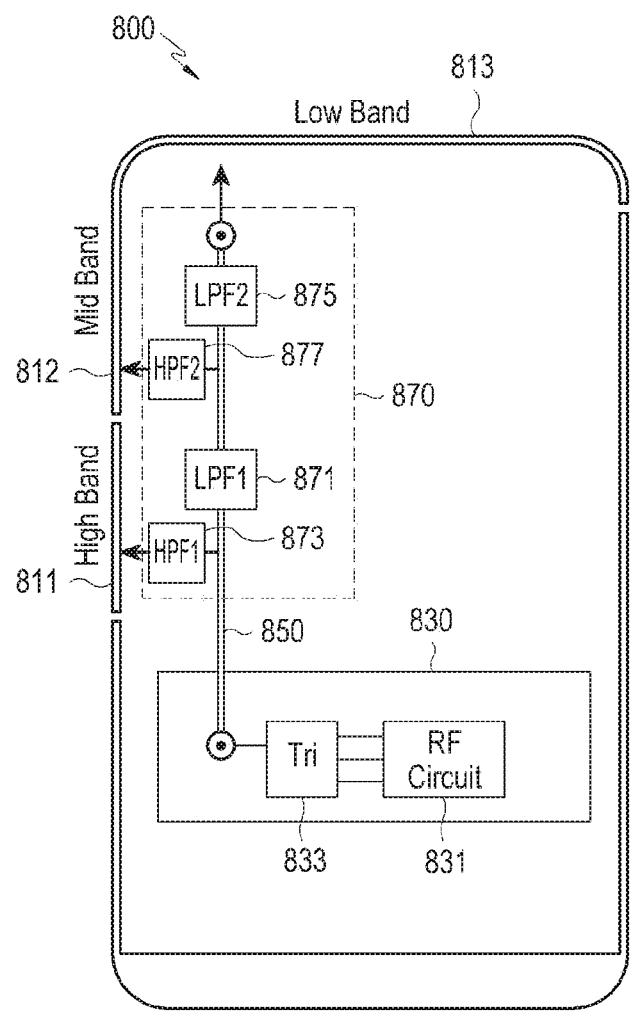
FIG. 8 is a circuit diagram illustrating an electronic device including a plurality of antennas according to various embodiments.

FIG. 8 is a circuit diagram illustrating an electronic device including a plurality of antennas according to various embodiments. Referring to FIG. 8, an electronic device 800 may feed three antennas through a single transmission line. For example, the electronic device 800 may apply signals corresponding to three different bands to a single coaxial cable via use of a triplexer.

The antenna device 800 may include a first antenna 811, a second antenna 812, a third antenna 813, an RF signal processor 830, a single transmission line 850, and a signal distribution coupler 870.

The first antenna 811, the second antenna 812, and the third antenna 813 may be antennas configured to operate on a first band, a second band, and a third band, respectively. The first antenna 811, the second antenna 812, and the third antenna 813 may be part of a metallic bezel (metal housing). For example, the electronic device 800 may include a metallic bezel. The metallic bezel may include at least one separator, and unit bezel parts into which the bezel is divided by the separator may be utilized as the first antenna 811, the second antenna 812, and the third antenna 813. Further, the RF signal processor 830 may include the RF circuit 831 and a diplexer 833. The signal distribution coupler 870 may include a first LPF 871, a first HPF 873, a second LPF 875, and a second HPF 877.

One end of the single transmission line 850 may be connected with one end of the first LPF 871 and one end of the first HPF 873, and the other end of the single transmission line 850 may be connected with the common port of the triplexer 833. The RF circuit 831 may be connected with the first port, second, and third ports of the triplexer 833. The other end of the first LPF 871 may be connected with one end of the second LPF 875 and one end of the second HPF 877, and the other end of the first HPF 873 may be connected with the first antenna 811. The other end of the second LPF 875 and the other end of the second HPF 877 may be connected with the third antenna 813 and the second antenna 812, respectively. Further, the first LPF 871 and the second LPF 875 may be connected with each other through, e.g., a coaxial cable. Further, the second LPF 875 and the third LPF 813 may be connected with each other through, e.g., a coaxial cable.

The first band, the second band, and the third band may be, e.g., a low band, a mid band, and a high band, so that the first antenna, the second antenna, and the third antenna may be a low-band antenna, a middle-band antenna, and a high-band antenna, respectively.

By the above-described configuration, the first HPF 873 at the front end of the feeding part of the first antenna 811 may transmit signals of a designated first band. The first LPF 871 at the front end of the feeding part of the first antenna 811 may transmit only signals of a lower band than the first band. Accordingly, signals of the first band may be avoided from being transmitted to the second antenna and the third antenna. The second LPF 875 and the second HPF 877 may perform in compliance with fitting their designated respective frequency bands.

Meanwhile, depending on the S11 state of each antenna, the first HPF 873 and/or the second HPF 877 may be omitted.

Figure 9A:
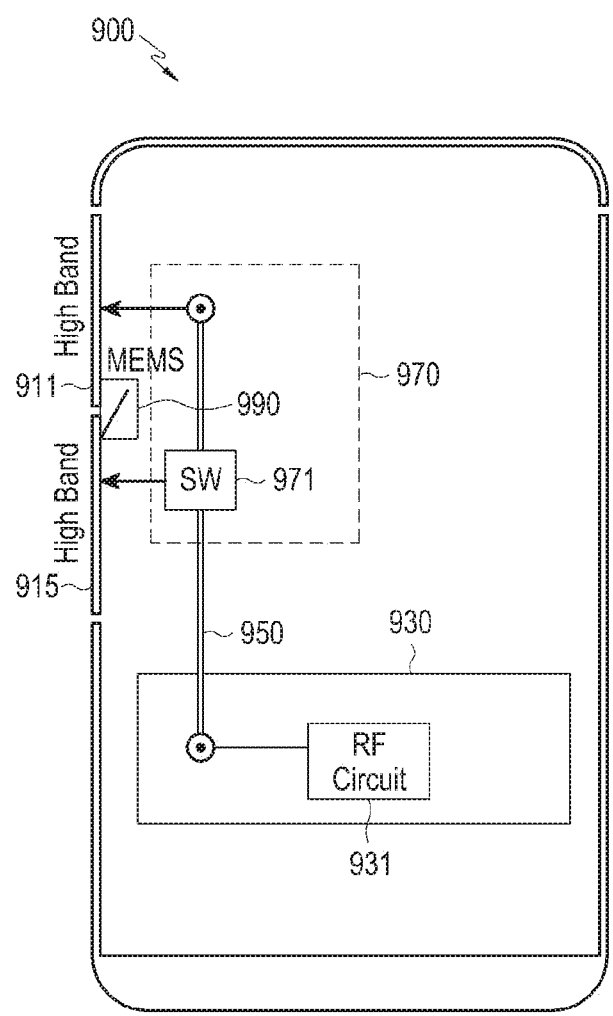
FIG. 9 is a circuit diagram illustrating an electronic device including a plurality of antennas according to various embodiments.
Figure 9B:
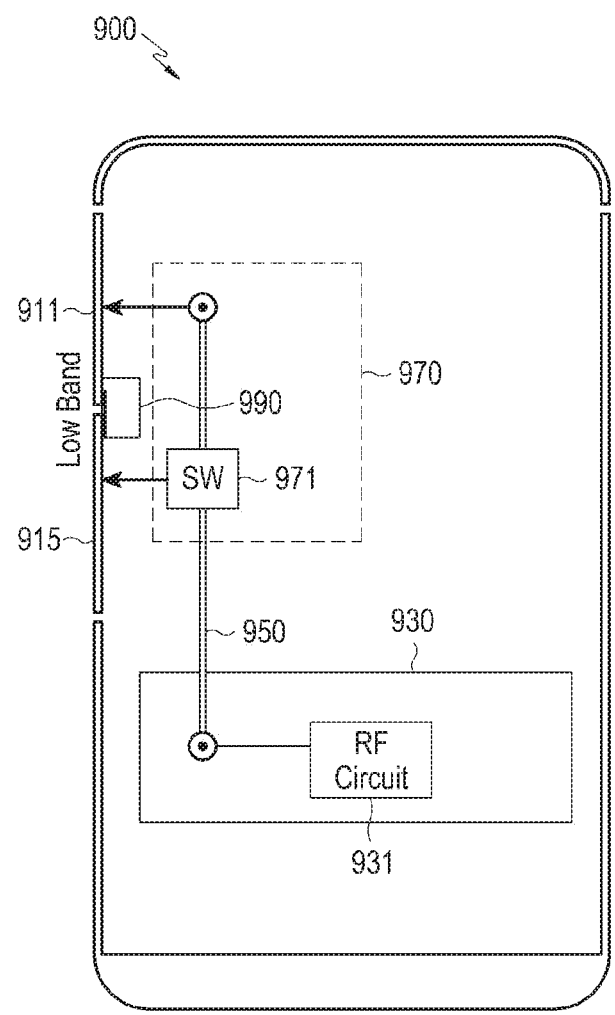

FIG. 9 is a circuit diagram illustrating an electronic device including a plurality of antennas according to various embodiments. Referring to FIG. 9, an electronic device 900 (e.g., the electronic device 400) may selectively connect an RF circuit 931 with each antenna. For example, when the electronic device 900 includes antennas supporting the same band (e.g., a first antenna 911 and a second antenna 915), despite supporting the same band, the antennas may present different performances depending on the state of use of the electronic device 900, e.g., the user's grip. In such context, the electronic device 900 may selectively connect the antennas depending on the performance of the antennas, allowing an antenna with better performance to operate.

The electronic device 900 may include the first antenna 911, the second antenna 915, an RF signal processor 930, a single transmission line 950, a signal distribution coupler 970, and a switch 990.

The first antenna 911 and the second antenna 915 may be antennas configured to operate on the same, first frequency band (e.g., a high band). The first antenna 911 and the second antenna 915 may be part of a metallic bezel (metal housing). For example, the electronic device 900 may include a metallic bezel. The metallic bezel may include at least one separator, and unit bezel parts into which the bezel is divided by the separator may be utilized as the first antenna 911 and the second antenna 913. Further, the RF signal processor 930 may include an RF circuit 931. The signal distribution coupler 970 may include a first switch 971.

One end of the single transmission line 950 may be connected with the first switch 971, and the other end of the single transmission line 950 may be connected with the RF circuit 931. Further, the first switch 971 may be connected with the first antenna 911 and the second antenna 915, and the RF circuit 931 may be connected with the first antenna 911 or the second antenna 915 according to control signals. Further, the first switch 971 and the first antenna 911 may be connected with each other via, e.g., a coaxial cable. The switch 990 may be connected between the first antenna 911 and the second antenna 915, selectively connecting the first antenna 911 and the second antenna 915 according to control signals. For example, the switch 990 may be positioned at the feeding part of the first antenna, selectively connecting the first antenna 911 and the second antenna 915 according to control signals. For example, according to control signals, the switch 990 may disconnect the first antenna 911 and the second antenna 915 as shown in FIG. 9(*a*) or connect the first antenna 911 and the second antenna 915 as shown in FIG. 9(*b*). If the first antenna 911 and the second antenna 915 are disconnected, the antenna device 900 may have two antennas with the same band operate. Further, if the first antenna 911 and the second antenna 915 are connected together, they be operated as antennas at a lower band than the first band. At this time, as the first switch 971 operates, the feeding part connected with the RF circuit 831 may be changed. For example, as the first switch 971 operates, the feeding part connected with the RF circuit 931 may be changed from the first antenna 911-side feeding part to the second antenna 915-side feeding part.

The switch 990 may be, e.g., a MEMS switch. Control signals may be produced by a controller (not shown) of the electronic device 900.

Figure 10:
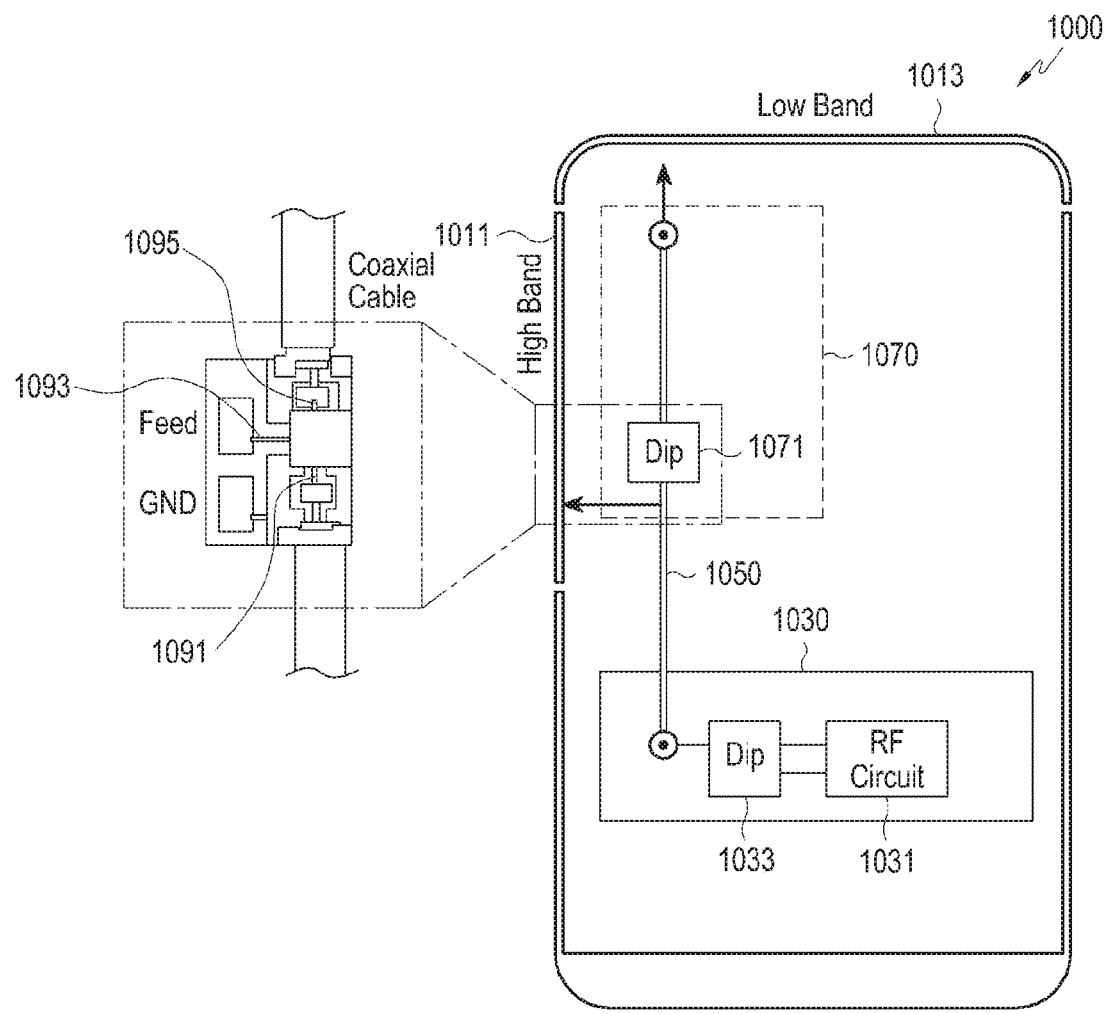
FIG. 10 is a circuit diagram illustrating an electronic device including a plurality of antennas according to various embodiments.

FIG. 10 is a circuit diagram illustrating an electronic device including a plurality of antennas according to various embodiments.

Referring to FIG. 10, an electronic device 1000 (e.g., the electronic device 400) may use a diplexer (a second diplexer 1071) to connect a single transmission line 1050 with two antennas, i.e., a first antenna 1011 and a second antenna 1013. For example, the single transmission line 1050 may be a coaxial cable. For example, the first antenna 1011 and the second antenna 1013 may be part of a metallic bezel (metal housing). For example, the electronic device 1000 may include a metallic bezel. The metallic bezel may include at least one separator, and unit bezel parts into which the bezel is divided by the separator may be utilized as the first antenna 1011 and the second antenna 1013.

A signal part of the coaxial cable 1050 and the GND may be connected to their respective corresponding pads on the PCB, so that the signal part of the coaxial cable may be connected to the common port 1091 of the second diplexer 1071. Further, the feed of the first antenna 1011 may be connected to the first port 1093 of the second diplexer 1071. Further, the coaxial cable connected with the second antenna 1013 may be connected to the second port 1095 of the second diplexer 1071. The ground line included outside the coaxial cable may be connected with the ground part GND of the first antenna 1011. The first antenna may be connected with the ground line outside the coaxial cable and connected with the first port 1093, configuring an inverted F-antenna form.

Meanwhile, the connections may be made by, e.g., clips or soldering.

According to various embodiments, an electronic device (e.g., the electronic device 101) may comprise an antenna module including a plurality of antennas corresponding to a plurality of bands, an RF signal processor configured to process signals of the plurality of bands, a single transmission line having an end connected with the RF signal processor and configured to transmit the signals of the plurality of bands between the RF signal processor and the antenna module, and a signal distribution coupler connected with another end of the single transmission line and configured to form signal paths corresponding to the plurality of antennas of the antenna module.

The RF signal processor may include a RF circuit and a diplexer having a first port and a second port connected with the RF circuit and a common port connected with another end of the single transmission line.

The signal distribution coupler may include a first bandpass filter having an end connected with a first antenna of the antenna module and another end connected with the other end of the single transmission line, connected with the other end of the single transmission line and corresponding to the first antenna configured to filter a signal of a second band corresponding to a second antenna.

The first band may differ in frequency from the second band.

The second antenna may be an antenna that reflects not less than a half of the signal of the first band received.

The electronic device may further comprise an ambient conductive member connected to a surrounding of a housing, wherein at least one of the first antenna or the second antenna may include at least part of the ambient conductive member.

The electronic device may further include a switch to connect or disconnect the first antenna from the second antenna according to a control signal.

Figure 11:
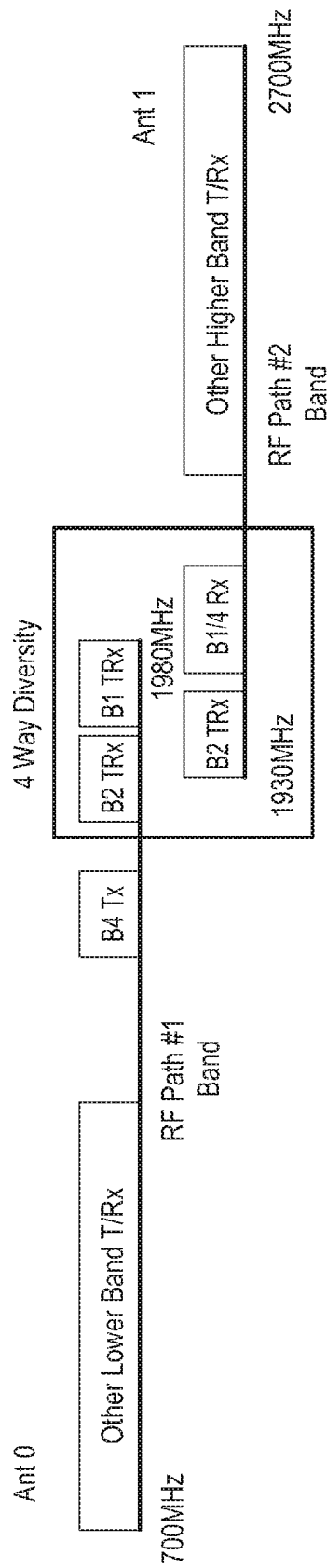
FIG. 11 is a view illustrating frequency bands of two antennas.

FIG. 11 is a view illustrating frequency bands of two antennas. Referring to FIG. 11, a band supported by a first antenna Ant 0 and a band supported by a second antenna Ant 1 may have an area where they partially overlap. For example, where the first antenna is a low-band and mid-band antenna, and the second antenna is a high-band antenna, the first antenna and the second antenna may have overlapping bands B1 and B2 from 1930 MHz to 1980 MHz. Although not shown, where the third antenna is a low-band and mid-band antenna like the first antenna, and the fourth antenna is a high-band antenna like the second antenna, the first antenna, the second antenna, the third antenna, and the fourth antenna may have overlapping bands B1 and B2 from 1930 MHz to 1980 MHz. According to various embodiments, an electronic device including a plurality of antennas may support the 4th order diversity through the above-described overlapping bands. According to various other embodiments, the frequency band supported by the first antenna and the third antenna may range from 600 MHz to 2.2 GHz. The frequency band supported by the second antenna and the fourth antenna may range from 1.6 GHz to 3 GHz. According to various embodiments, the frequency band supported by the first antenna and the third antenna may range from 600 MHz to 3 GHz. The frequency band supported by the second antenna and the fourth antenna may range from 1.6 GHz to 3 GHz. For example, if the first antenna is connected to a front end LB FEM corresponding to the low band of a main transceiver (also called transmission/reception path, for example) or a front end MB FEM corresponding to the mid band, the second antenna is connected with a front end HMB FEM corresponding to the high band and mid band of the main transceiver, the third antenna is connected with a front end MB FEM corresponding to the mid band or a front end LB FEM corresponding to the low band of a diversity receiver (also called reception path), and the fourth antenna is connected with a front end HMB FEM corresponding to the high band and mid band of the diversity receiver, the first antenna may perform the transmission and reception of signals of the overlapping bands while the remaining antennas perform reception of signals of the overlapping bands, allowing the antenna device to perform the 4th diversity operation.

Meanwhile, the above-described main transceiver and diversity receiver may be connected to a controller (e.g., the processor 120). Further, the main transceiver may convert baseband signals, which are input from the controller and are to be transmitted, into RF signals and output the RF signals. Further, the main transceiver and diversity receiver may convert RF signals received through any one of the plurality of antennas into baseband signals and output the baseband signals to the controller.

Further, in the above-described connections, the antenna performing transmission of signals on the overlapping band may be changed as per the switching operation described below.

The switching operation of the electronic device supporting the 4th diversity antenna through the above-described overlapping band is described below with reference to FIGS. 12a to 12e.

Figure 12A:
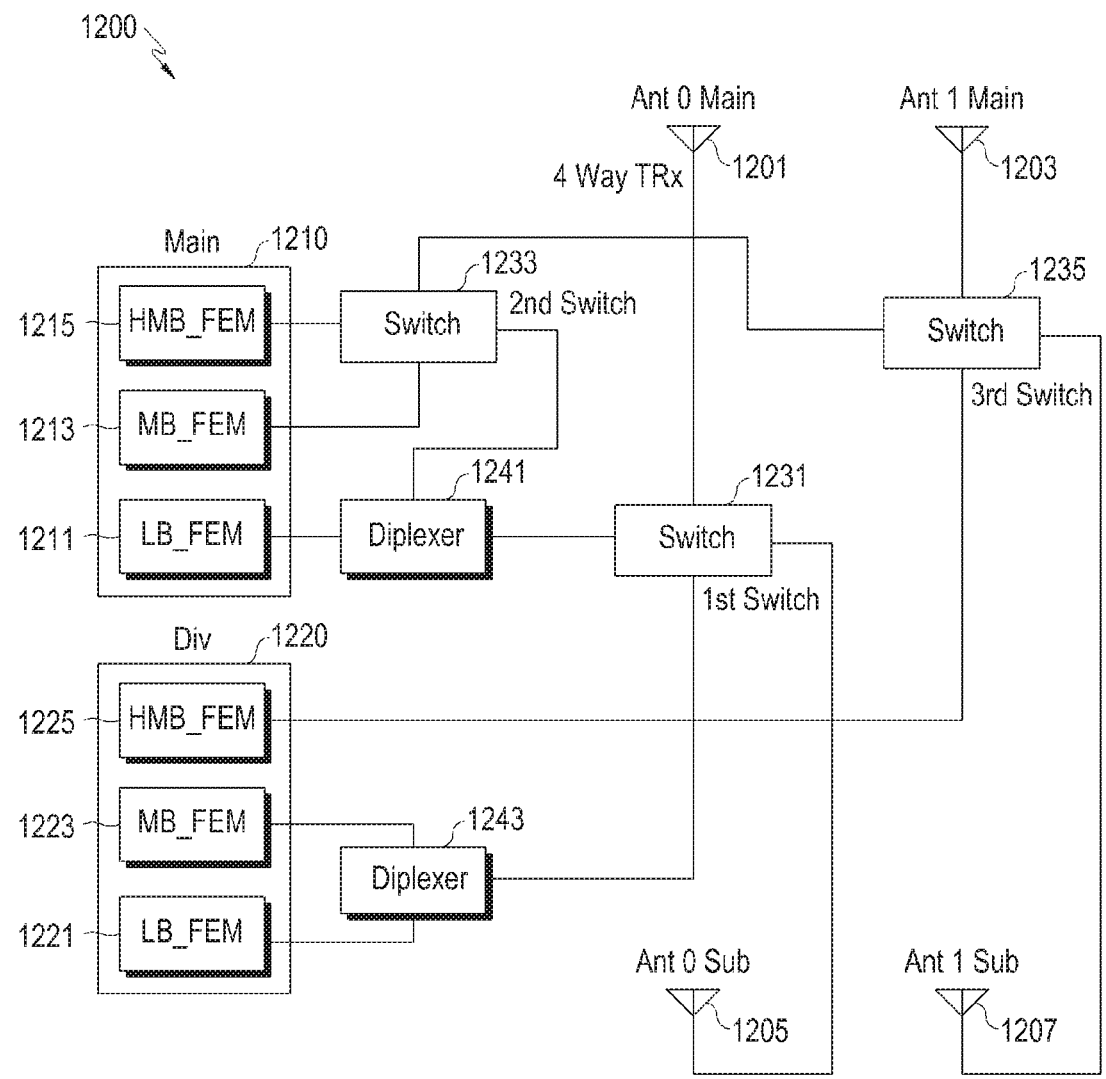
FIGS. 12a to 12e are circuit diagrams illustrating an electronic device including a plurality of antennas according to various embodiments.

Referring to FIG. 12a, an electronic device 1200 may include a first antenna 1201 (Ant0 Main), a second antenna 1203 (Ant1 Main), a third antenna 1205 (Ant0 Sub), and a fourth antenna 1207 (Ant 1 Sub).

For example, the first antenna 1201 and the third antenna 1205 may support a first band, and the second antenna 1203 and the fourth antenna 1207 may support a second band partially overlapping the first band. For example, the first band of the first antenna 1201 and the third antenna 1205 may be a band supported by the first antenna Ant 0 of FIG. 11, and the second band of the second antenna 1203 and the fourth antenna 1207 may be a band supported by the second antenna Ant 1 of FIG. 11.

Further, the electronic device 1200 may include a transceiver 1210 including front ends each corresponding to a respective one of a plurality of bands. For example, the main transceiver 1210 may include a first front end 1211 corresponding to a third band, a second front end 1213 corresponding to a fourth band, and a third front end 1215 corresponding to a fifth band.

Further, the electronic device 1200 may include a diversity receiver 1220 including front ends each corresponding to a respective one of the plurality of bands. For example, the diversity receiver 1220 may include a first front end 1221 corresponding to the third band, a second front end 1223 corresponding to the fourth band, and a third front end 1225 corresponding to the fifth band.

For example, the third band may be a low band (LB), the fourth band may be a mid band (MB), and the fifth band may be a high and mid band (HMB).

Further, the electronic device 1200 may include a first switch 1231, a second switch 1233, and a third switch 1235 and a first diplexer 1241 and a second diplexer 1243.

The first switch 1231 may connect any one of the first antenna 1201 and the third antenna 1205 to the main transceiver 1210 and the other to the diversity receiver 1220.

The third switch 1235 may connect any one of the second antenna 1203 and the fourth antenna 1207 to the main transceiver 1210 and the other to the diversity receiver 1220.

The first port and the second port of the first diplexer 1241 may be connected with the second switch 1233 and the first front end 1211 of the main transceiver 1210, and the common port of the first diplexer 1241 may be connected with the first switch 1231.

The second switch 1233 may connect any one of the third switch 1235 and the first port of the first diplexer 1241 to the third front end 1215 of the main transceiver 1210 and the other to the second front end 1213 of the main transceiver 1210.

The first port and the second port of the second diplexer 1243 may be connected with the first front end 1221 and second front end 1223, respectively, of the diversity receiver 1220, and the common port may be connected with the first switch 1231.

The first to third switches 1231, 1233, and 1235 may be controlled for their switching operation according to control signals. The control signals may be produced by the controller of the electronic device 1200. Further, the first to third switches 1231, 1233, and 1235 may be 2P2T switches.

Figure 12B:
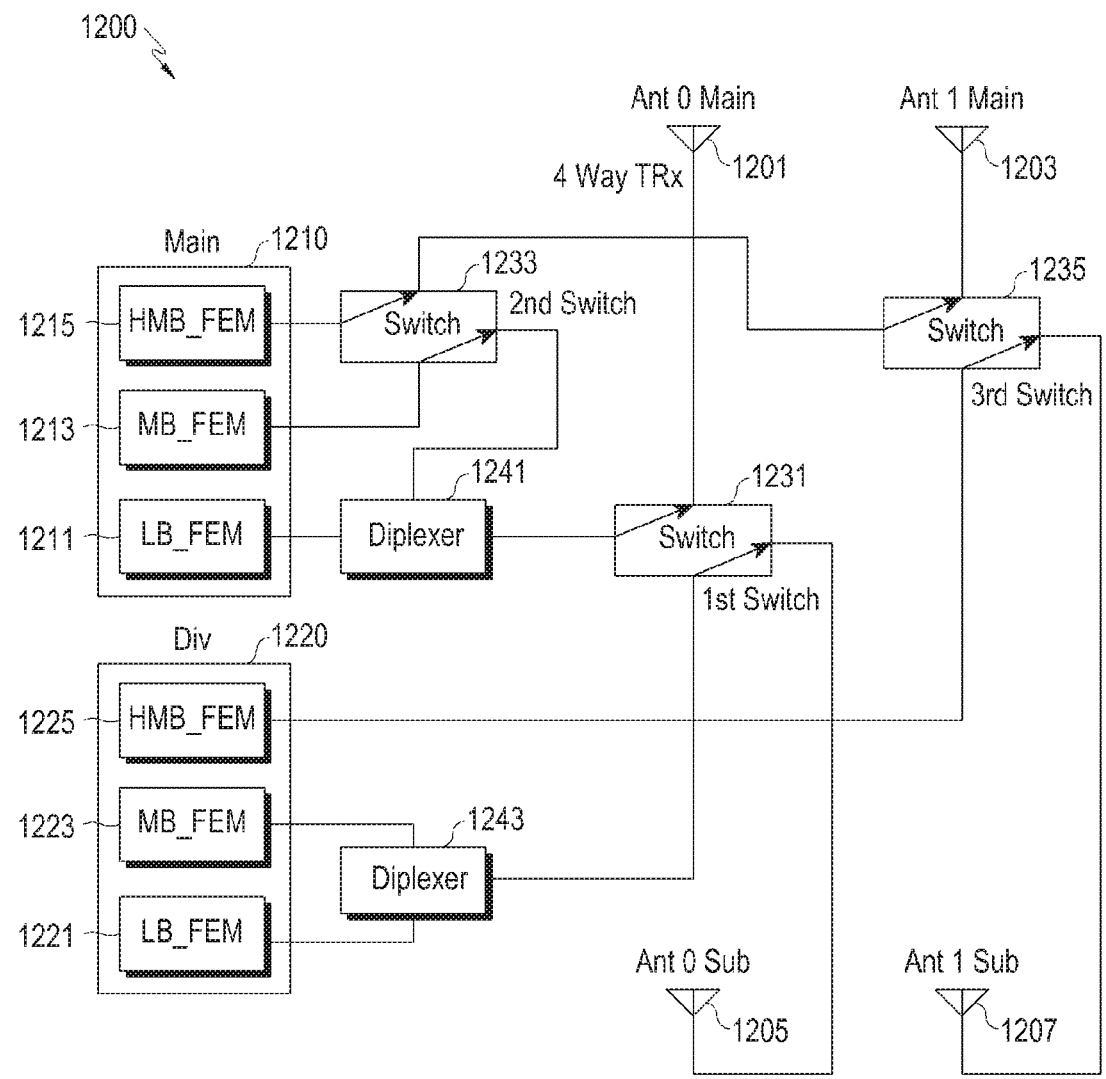

Referring to FIG. 12b, as per the control signals, the first switch 1231 may be switched to connect the first antenna 1201 to the common port of the first diplexer 1241 and the third antenna 1205 to the common port of the second diplexer 1243.

Further, by the control signals, the second switch 1233 may be switched to connect the third switch 1235 to the third front end 1215 of the main transceiver 1210 and the first port of the first diplexer 1241 to the second front end 1213 of the main transceiver 1210.

Also, according to the control signals, the third switch 1235 may be switched to connect the second antenna 1205 through the second switch 1223 to the third front end 1215 of the main transceiver 1210 and the fourth antenna 1207 to the third front end 1225 of the diversity receiver 1220.

As set forth above, if the first front end 1211 of the main transceiver 1210 is a low-band front end, the second front end 1213 is a mid-band front end, and the third front end 1215 is a high band and mid-band front end, when the bands of the first to fourth antennas 1201, 1203, 1205, and 1207 all include the overlapping band, it can be seen from the configuration of FIG. 12b that the first antenna 1201 performs transmission and reception of signals on the overlapping band and the remaining antennas 1203, 1205, and 1207 are in charge of reception of signals on the overlapping band.

According to an embodiment, if the first antenna 1201 and the third antenna 1205 support both the first band and the second band, the fifth band, high band and mid band (HBM) may be included in the overlapping band. When the high band and mid band are included in the overlapping band, if the second front end 1213 and the third front end 1215 add a high-band receiving end, then in the switching states of the first to third switches 1231, 1233, and 1235 of FIG. 12b, the second antenna 1201 may perform reception and transmission on the mid band or high band, and the remaining antennas 1203, 1205, and 1207 may be in charge of reception of signals on the overlapping band.

Figure 12C:
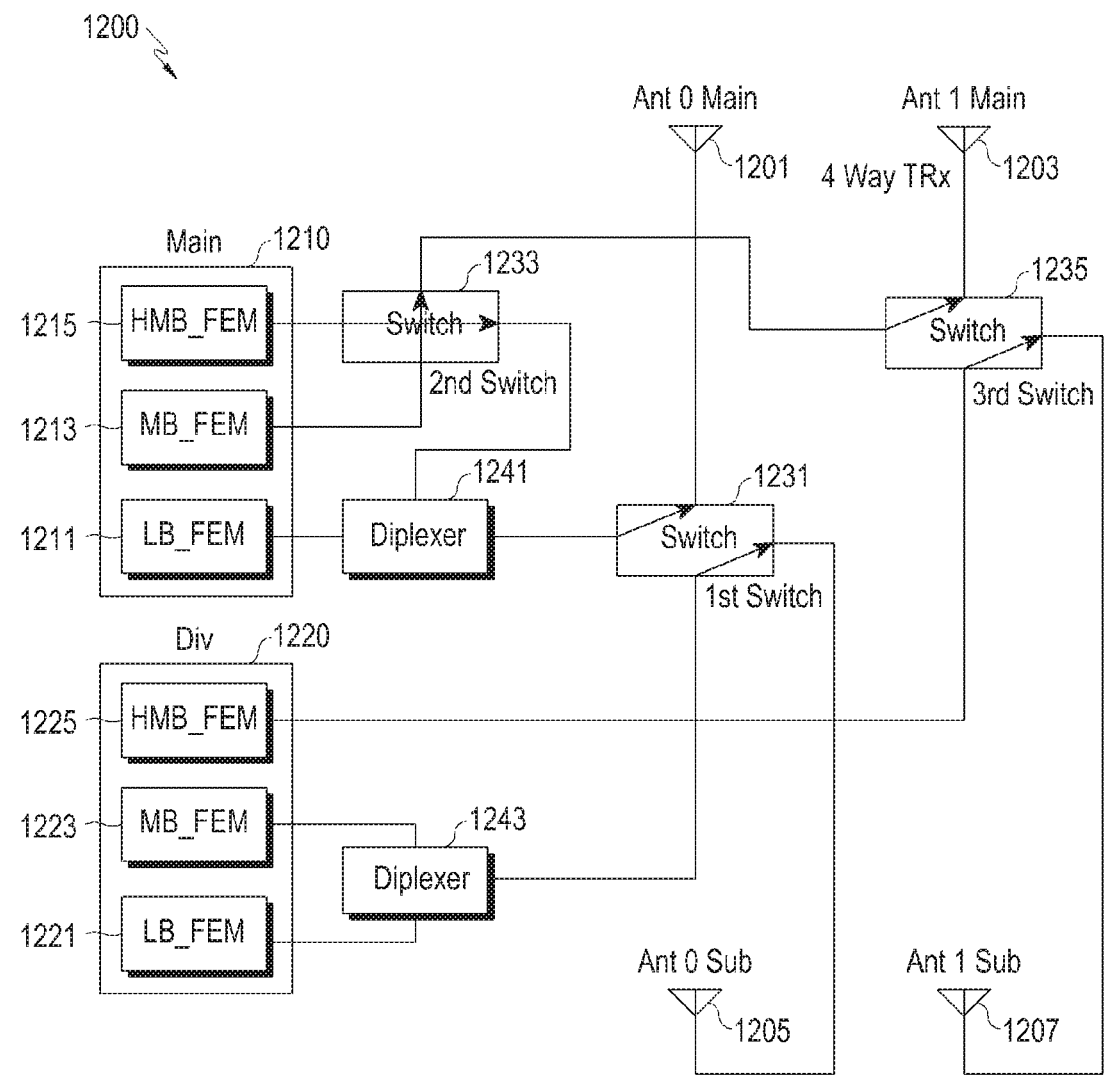

Referring to FIG. 12c, as per the control signals, the first switch 1231 may be switched to connect the first antenna 1201 to the common port of the first diplexer 1241 and the third antenna 1205 to the common port of the second diplexer 1243.

Further, by the control signals, the second switch 1233 may be switched to connect the first port of the first diplexer 1241 to the third front end 1215 of the main transceiver 1210 and the third switch 1235 to the second front end 1213 of the main transceiver 1210.

Also, according to the control signals, the third switch 1235 may be switched to connect the third antenna 1205 through the second switch 1233 to the second front end 1213 of the main transceiver 1210 and the fourth antenna 1207 to the third front end 1225 of the diversity receiver 1220.

As set forth above, if the first front end 1211 of the main transceiver 1210 is a low-band front end, the second front end 1213 is a mid-band front end, and the third front end 1215 is a high band and mid-band front end, when the bands of the first to fourth antennas 1201, 1203, 1205, and 1207 all include the overlapping band, it can be seen from the configuration of FIG. 12c that the second antenna 1203 performs transmission and reception of signals on the overlapping band and the remaining antennas 1201, 1205, and 1207 are in charge of reception of signals on the overlapping band.

According to an embodiment, if the first antenna 1201 and the third antenna 1205 support both the first band and the second band, the fifth band, high band and mid band (HBM) may be included in the overlapping band. When the high band and mid band are included in the overlapping band, if the second front end 1213 and the third front end 1215 add a high-band receiving end, then in the switching states of the first to third switches 1231, 1233, and 1235 of FIG. 12c, the second antenna 1203 may perform reception and transmission on the mid band or high band, and the remaining antennas 1201, 1205, and 1207 may be in charge of reception of signals on the overlapping band.

Figure 12D:
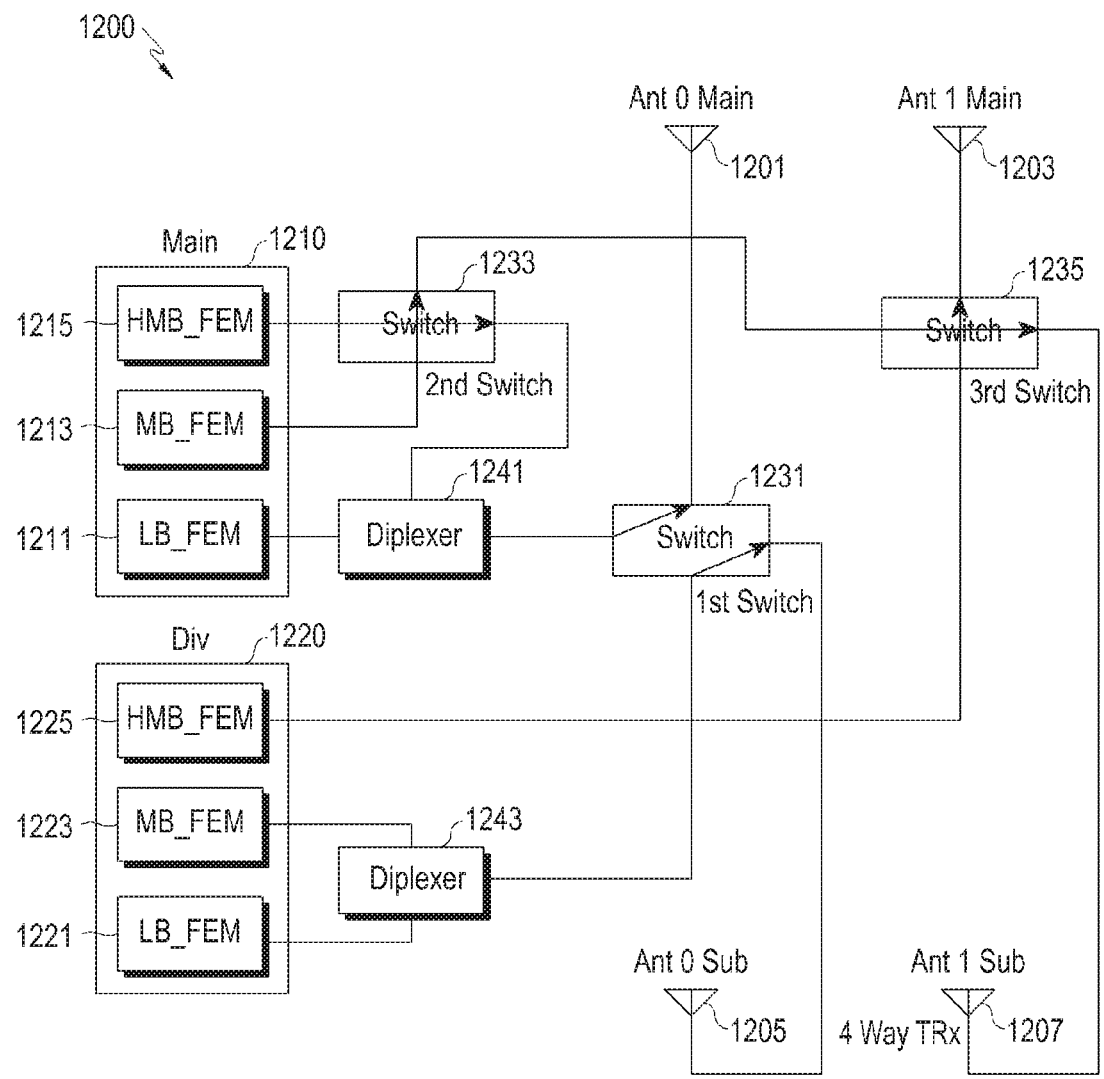

Referring to FIG. 12d, as per the control signals, the first switch 1231 may be switched to connect the first antenna 1201 to the common port of the first diplexer 1241 and the second antenna 1203 to the common port of the second diplexer 1243.

Further, by the control signals, the second switch 1233 may be switched to connect the first port of the first diplexer 1241 to the third front end 1215 of the main transceiver 1210 and the third switch 1235 to the second front end 1213 of the main transceiver 1210.

Also, according to the control signals, the third switch 1235 may be switched to connect the fourth antenna 1207 through the second switch 1233 to the second front end 1213 of the main transceiver 1210 and the third antenna 1235 to the third front end 1225 of the diversity receiver 1220.

Figure 15:
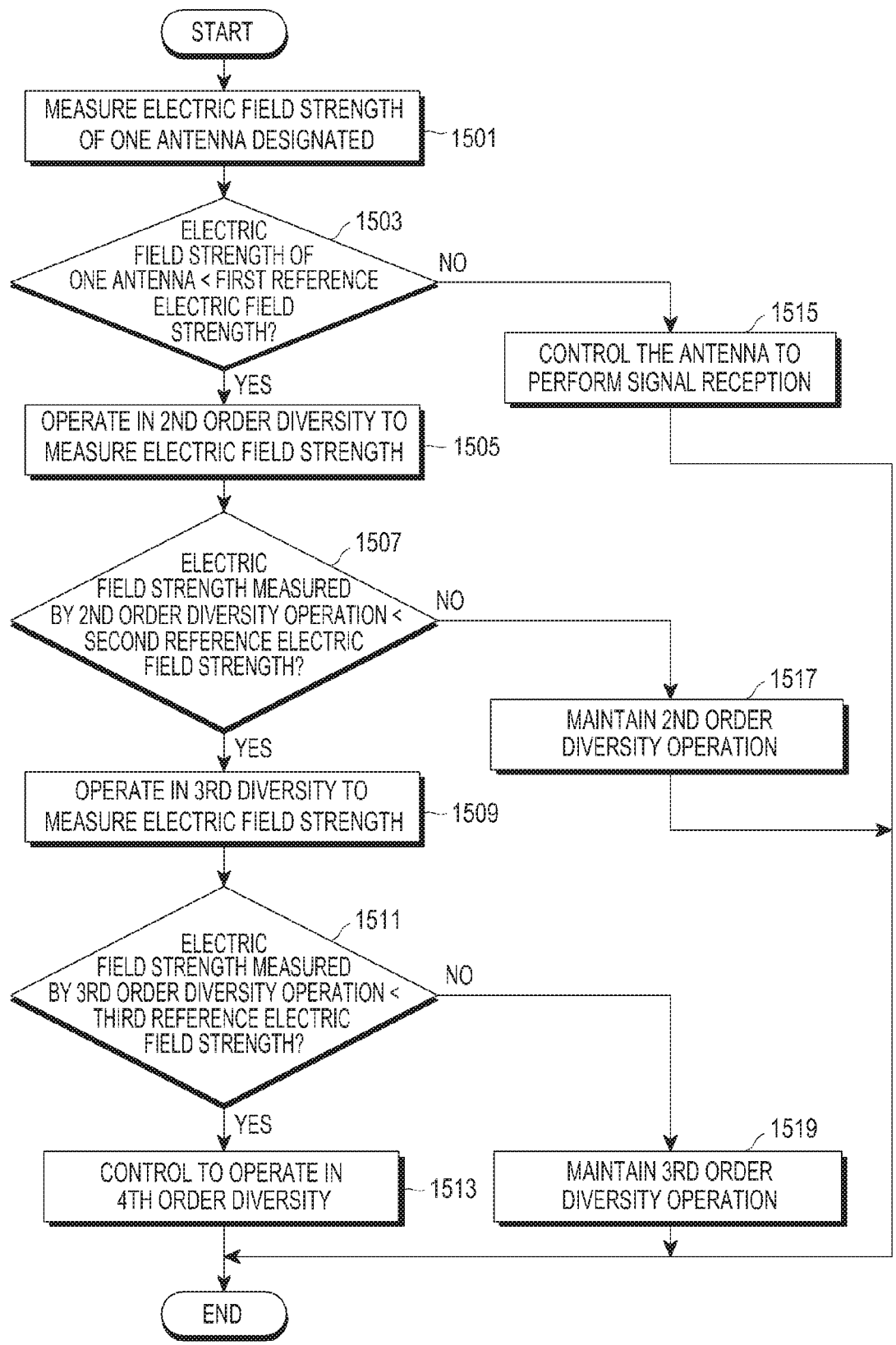
FIG. 15 is a flowchart illustrating the operation of determining the antenna diversity order of an electronic device according to various embodiments.

As set forth above, if the first front end 1211 of the main transceiver 1210 is a low-band front end, the second front end 1213 is a mid-band front end, and the third front end 1215 is a high band and mid-band front end, when the bands of the first to fourth antennas 1201, 1203, 1205, and 1207 all include the overlapping band, it can be seen from the configuration of FIG. 15 that the fourth antenna 1207 performs transmission and reception of signals on the overlapping band and the remaining antennas 1201, 1203, and 1205 are in charge of reception of signals on the overlapping band.

According to an embodiment, if the first antenna 1201 and the third antenna 1205 support both the first band and the second band, the fifth band, high band and mid band (HBM) may be included in the overlapping band. When the high band and mid band are included in the overlapping band, if the second front end 1213 and the third front end 1215 add a high-band receiving end, then in the switching states of the first to third switches 1231, 1233, and 1235 of FIG. 12d, the fourth antenna 1207 may perform reception and transmission on the mid band or high band, and the remaining antennas 1201, 1203, and 1205 may be in charge of reception of signals on the overlapping band.

Figure 12E:
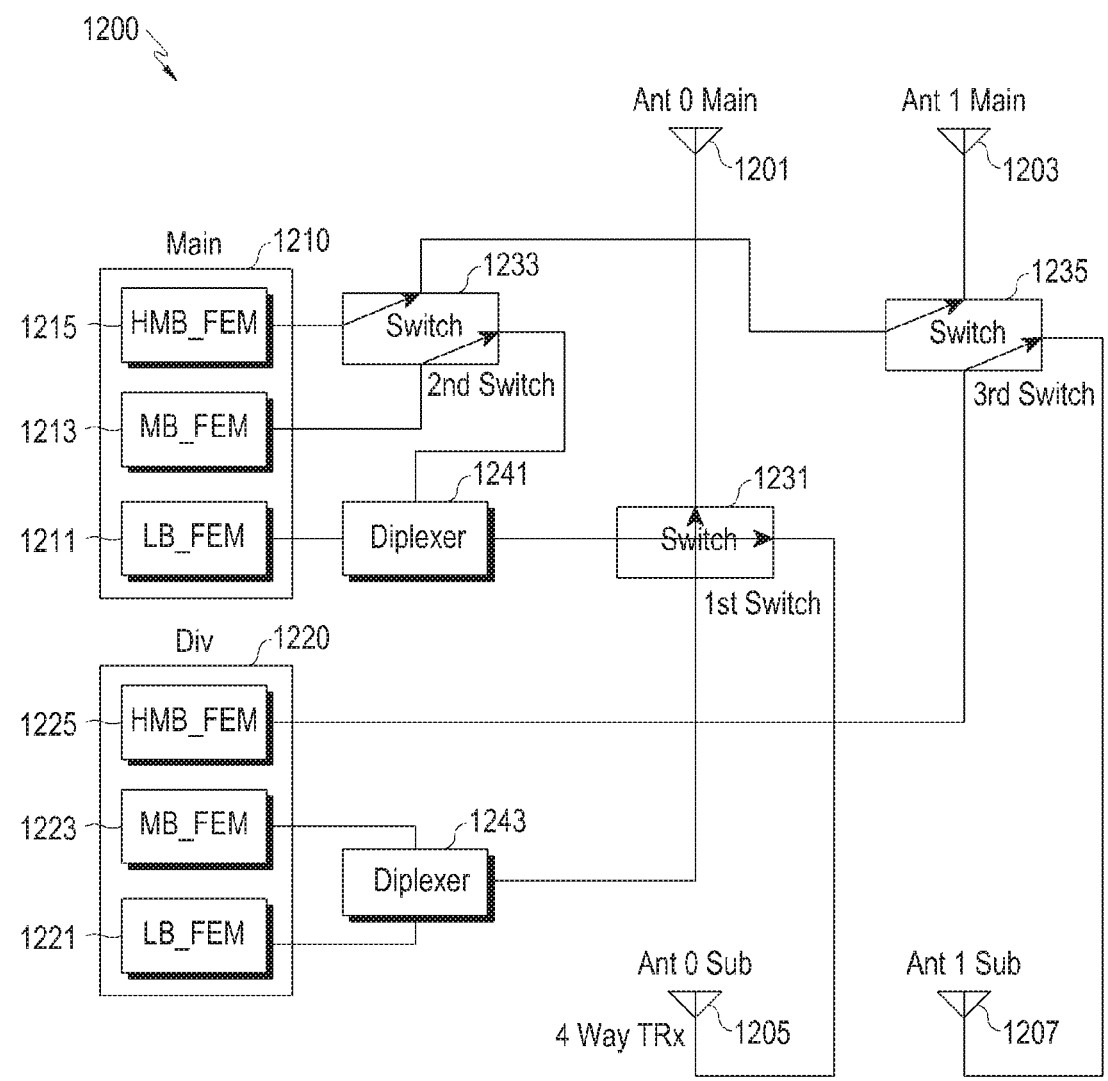

Referring to FIG. 12e, as per the control signals, the first switch 1231 may be switched to connect the third antenna 1205 to the common port of the first diplexer 1241 and the first antenna 1201 to the common port of the second diplexer 1243.

Further, by the control signals, the second switch 1233 may be switched to connect the third switch 1235 to the third front end 1215 of the main transceiver 1210 and the first port of the first diplexer 1241 to the second front end 1213 of the main transceiver 1210.

Also, according to the control signals, the third switch 1235 may be switched to connect the third antenna 1205 to any one point where the third front end 1215 of the main transceiver 1210 and the third switch 1235 are connected and the fourth antenna 1207 to the third front end 1225 of the diversity receiver 1220.

As set forth above, if the first front end 1211 of the main transceiver 1210 is a low-band front end, the second front end 1213 is a mid-band front end, and the third front end 1215 is a high band and mid-band front end, when the bands of the first to fourth antennas 1201, 1203, 1205, and 1207 all include the overlapping band, it can be seen from the configuration of FIG. 12e that the third antenna 1205 performs transmission and reception of signals on the overlapping band and the remaining antennas 1201, 1203, and 1207 are in charge of reception of signals on the overlapping band.

According to an embodiment, if the first antenna 1201 and the third antenna 1205 support both the first band and the second band, the fifth band, high band and mid band (HBM) may be included in the overlapping band. When the high band and mid band are included in the overlapping band, if the second front end 1213 and the third front end 1215 add a high-band receiving end, then in the switching states of the first to third switches 1231, 1233, and 1235 of FIG. 12e, the third antenna 1205 may perform reception and transmission on the mid band or high band, and the remaining antennas 1201, 1203, and 1207 may be in charge of reception of signals on the overlapping band.

Meanwhile, signals on the non-overlapping band may be subject to the 2nd diversity. For example, the first antenna 1201 or the third antenna 1205 may selectively be set as the antenna in charge of the transmission and reception of signals using the first switch 1231. Further, the second antenna 1203 or fourth antenna 1207 may selectively be set as the antenna in charge of the transmission and reception of signals using the third switch 1235.

Figure 13:
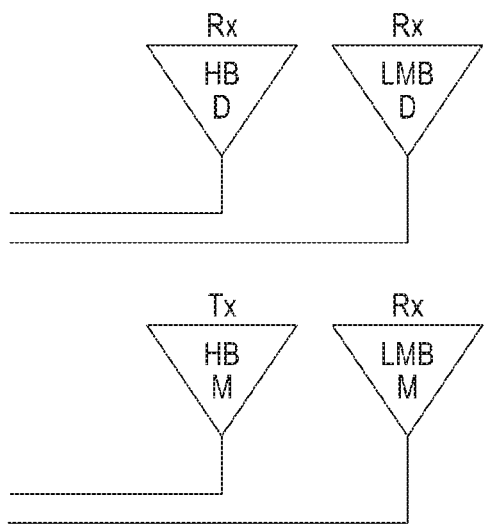
FIG. 13 is a view illustrating antennas of an electronic device according to various embodiments.

Meanwhile, where signal transmission and reception are simultaneously carried out via one antenna, isolation between transmission and reception signals may be lowered, likely causing the transmission signal to interfere with the reception signal. Accordingly, the output of the transmission signal may be limited. Further, in some contexts, obtaining a higher transmission output may be more critical than obtaining a reception diversity gain. In such case, as shown in FIG. 13, in an electronic device including a plurality of antennas, at least one antenna may be in charge of transmission of signals, and the remaining antennas may receive signals. For example, in the circuits shown in FIGS. 12b to 12e, among four antennas, the antenna performing transmission and reception of signals on the overlapping band may be in charge of transmission of signals while the other antennas are fully in charge of reception of signals. By so doing, the electronic device may have a third diversity gain and high transmission output.

If received electric field strength or reception quality becomes better, the electronic device may perform smooth communication even when its diversity does not work. Further, operating in full diversity order may trigger a problem with current consumption in the electronic device. Accordingly, determining and using a diversity order depending on the received electric field strength and/or quality context may drive the electronic device in a more efficient fashion.

The above-described electronic device 1200 may determine to allow any one of the plurality of antennas to perform transmission as per the switching operation of the first to third switches 1231, 1233, and 1235. The antenna device 1200 may check the received electric field strength (or reception signal quality) of each of the antennas and choose the antenna of the best condition so that the switching operation may be performed by the chosen antenna.

Meanwhile, the transmission performance of antenna may be the same, better, or worse than the reception performance of antenna. Thus, one antenna may be selected to perform transmission by applying an offset between transmission and reception antennas, which has previously been measured, to the received electric field strength (or reception signal quality).

TABLE 1

| Ant | RSSI or RSRP or RSRQ (dBm) | T/Rx Ant Offset (transmission/reception antenna offset) | Corrected (transmission performance) |
| --- | --- | --- | --- |
| second antenna | −102 | −4 | −106 |
| first antenna | −99 | −5 | −104 |
| fourth antenna | −102 | −1 | −103 |
| third antenna | −102 | −2 | −104 |

For example, per-antenna transmission performance may be determined in combination of the received signal strength indicator (RSSI), reference signal received power (RSRP), or reference signal received quality (RSRQ) value and transmission and reception antenna offset previously measured. Referring to Table 1 above, the fourth antenna may be selected to perform transmission.

Figure 14:
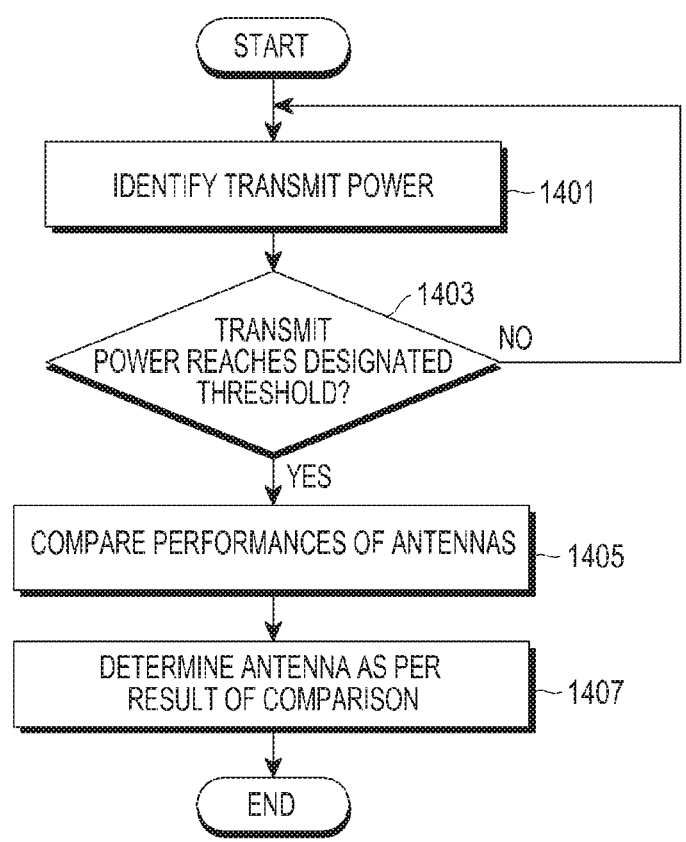
FIG. 14 is a flowchart illustrating the operation of determining the antenna diversity order of an electronic device according to various embodiments.

FIG. 14 is a flowchart illustrating operations of an electronic device including a plurality of antennas according to various embodiments. Referring to FIG. 14, unless the current transmission performance of an electronic device (e.g., the electronic device 1200) is a predetermined value or less, no operations for measuring and comparing electric fields necessary for antenna switching may be carried out. For instance, if the transmit power reaches a threshold, or upon identifying a command (TPC+) to increase power despite arrival of the transmit power at the threshold, the electronic device may compare per-antenna performances and select the antenna with the best performance.

In operation 1401, the electronic device may identify its transmit power.

In operation 1403, the electronic device may determine whether the transmit power reaches a designated threshold. In operation 1403, the electronic device may perform operation 1405 upon identifying that the transmit power reaches the designated threshold, and otherwise, reperform operation 1401.

In operation 1405, the electronic device may compare the performance of the antennas of the electronic device. The performance may be the transmission performance as set forth in Table 1 above.

In operation 1407, the electronic device may determine an antenna to be operated as per a result of the comparison. For example, where the performance is the transmission performance of Table 1 above, an antenna to perform the transmission function may be determined according to the result of the comparison.

According to various embodiments, the electronic device may be operated as shown in FIG. 15 to be driven given the received electric field strength of the antenna.

FIG. 15 is a flowchart illustrating the operation of determining an order of diversity of an antenna of an electronic device (e.g., the electronic device 1200) including four antennas according to various embodiments.

Referring to FIG. 15, in operation 1501, the electronic device may measure the electric field strength of one designated antenna.

In operation 1503, the electronic device may determine whether the electric field strength of the antenna is a first reference electric field strength or less. Such control may be performed so as to perform operation 1505 if the electric field strength of the antenna is the first reference electric field strength or less or to otherwise allow the antenna to perform signal reception (no diversity reception operation) in operation 1515.

In operation 1505, the electronic device may operate in the second order diversity to measure electric field strength.

In operation 1507, the electronic device may determine whether the electric field strength measured by the electronic device operating in the second order diversity is a second reference electric field strength or less. If the electric field strength measured by the electronic device operating in the second order diversity is the second reference electric field strength or less, operation 1509 may be performed, and otherwise, the antenna device may maintain the operation in the second order diversity in operation 1517.

In operation 1509, the electronic device may operate in the third order diversity to measure electric field strength.

In operation 1511, the electronic device determines whether the electric field strength measured by the electronic device operating in the third order diversity is a third reference electric field strength or less. If the electric field strength measured by the electronic device operating in the third order diversity is the third reference electric field strength or less, operation 1531 may be performed, and otherwise, the electronic device may maintain the operation in the third order diversity in operation 1519.

In operation 1513, the electronic device may perform control so that the electronic device operates in the fourth order diversity.

The above-described operations may be periodically performed, and an antenna diversity order fitting the reception context may be selected as per the above-described operations, and operation may be performed.

Figure 16:
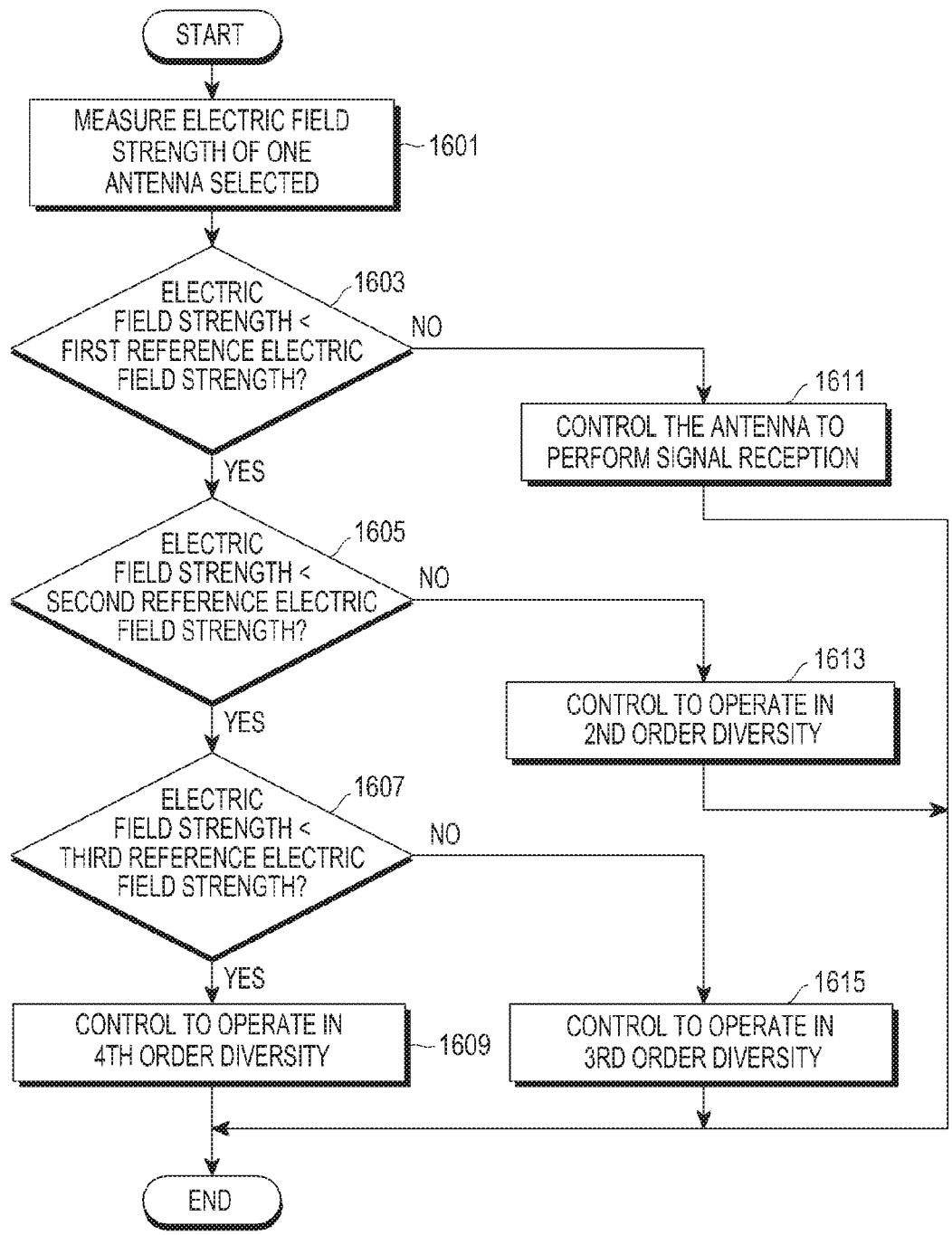
FIG. 16 is a flowchart illustrating operations of an electronic device including a plurality of antennas according to various embodiments.

FIG. 16 is a flowchart illustrating the operation of determining the antenna diversity order of an electronic device according to various embodiments.

Referring to FIG. 16, in operation 1601, an electronic device (e.g., the electronic device 1200) may measure the electric field strength of the antenna selected. For example, the antenna selected may be an antenna performing both transmission and reception of signals.

In operation 1603, the electronic device may determine whether the electric field strength is a first reference electric field strength or less. If the electric field strength is the first reference electric field strength in operation 1603, the electronic device may perform operation 1605, and otherwise, perform control to allow the antenna to perform signal reception in operation 1611.

In operation 1605, the electronic device may determine whether the electric field strength is a second reference electric field strength or less. In operation 1605, the electronic device may perform operation 1607 if the electric field strength is the second reference electric field strength or less. Otherwise, the electronic device may perform control to operate in the second order diversity in operation 1613.

In operation 1607, the electronic device may determine whether the electric field strength is a third reference electric field strength or less. In operation 1607, the electronic device may perform operation 1609 if the electric field strength is the third reference electric field strength or less. Otherwise, the electronic device may perform control to operate in the third order diversity in operation 1615.

In operation 1609, the electronic device may perform control to operate in the fourth order diversity.

Meanwhile, the first reference electric field strength may be larger than the second reference electric field strength, and the second reference electric field strength may be previously designated as a value larger than the third reference electric field strength.

Figures 17A, 17B:
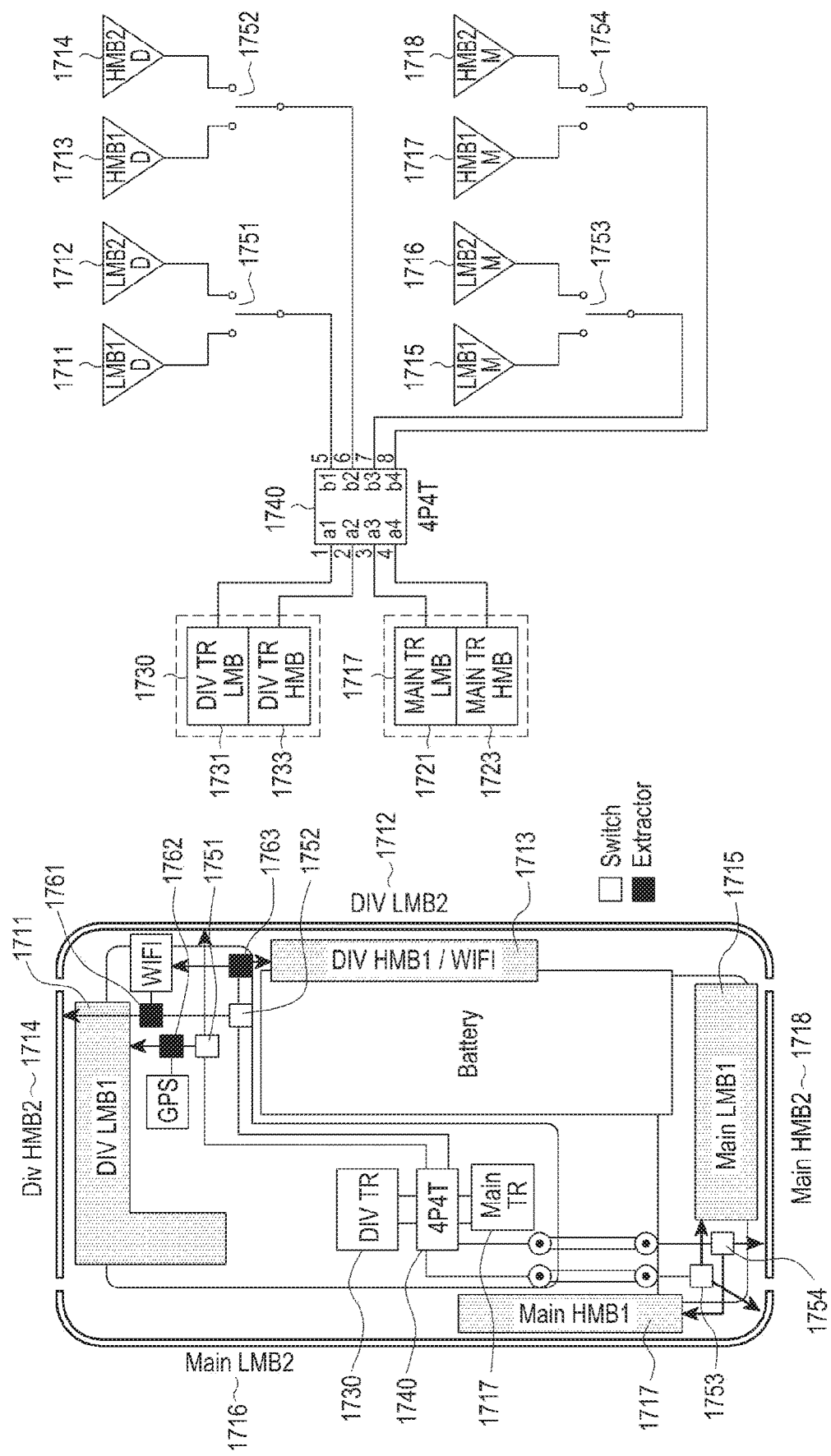
FIG. 17 is a circuit diagram illustrating an electronic device including a plurality of antennas according to various embodiments.

FIG. 17 is a circuit diagram illustrating an electronic device including a plurality of antennas according to various embodiments. Referring to FIG. 17, a plurality of antennas may be connected via a small number of transmission lines using the above-described methods, and each antenna is configured to be selectively connected.

The electronic device 1700 may include a first antenna 1711 (DIV LMB1), a second antenna 1712 (DIV LMB2), a third antenna 1713 (DIV HMB1), a fourth antenna 1714 (DIV HMB2), a fifth antenna 1715 (Main LMB1), a sixth antenna 1716 (Main LMB2), a seventh antenna 1717 (Main HMB1), and an eighth antenna 1718 (Main HMB2).

The first antenna 1711 and the second antenna 1712 may be low-band and mid-band diversity antennas, the third antenna 1713 and the fourth antenna 1714 may be mid-band and high-band diversity antennas, the fifth antenna 1715 and the sixth antenna 1716 may be low-band and mid-band main antennas, and the seventh antenna 1717 and the eighth antenna 1718 may be mid-band and high-band main antennas. Further, the second antenna 1712, the fourth antenna 1714, the sixth antenna 1716, and the eighth antenna 1718 may be part of a metallic bezel (metal housing). For example, the electronic device 1700 may include a metallic bezel. The metallic bezel may include at least one separator, and unit bezel parts into which the bezel is divided by the separator may be utilized as the second antenna 1712, the fourth antenna 1714, the sixth antenna 1716, and the eighth antenna 1718.

The configuration of two antennas with the same band in the electronic device 1700 may be for allowing the one with better performance of the two antennas to operate, e.g., depending on the state of use of the electronic device, e.g., the user's grip.

Further, the electronic device 1700 may include a main transceiver 1720 and a diversity receiver 130.

The main transceiver 1720 and the diversity receiver 1730 each may be connected with a switch 1740. For example, the main transceiver 1730 may include a first front end 1721 (MAIN TR LMB) and a second front end 1723 (MAIN TR HMB). The first front end 1721 may be connected with the first port of the switch 1740, and the second front end 723 may be connected with the second port of the switch. The diversity receiver 1730 may include a first front end 1731 (DIV TR LMB) and a second front end 1733 (DIV TR HMB). The first front end 1731 may be connected with the third port of the switch 1740, and the second front end 1733 may be connected with the fourth port of the switch.

The fifth to eighth ports of the switch 1740 may be connected with a first sub switch 1751, a second sub switch 1752, a third sub switch 1753, and a fourth sub switch 1754.

The first sub switch 1751 may be connected with the first antenna 1711 and the second antenna 1712 to connect the fifth port of the switch 1740 to the first antenna 1711 or the second antenna 1712 as per control signals.

The second sub switch 1752 may be connected with the third antenna 1713 and the fourth antenna 1714 to connect the sixth port of the switch 1740 to the third antenna 1713 or the fourth antenna 1714 as per control signals.

The third sub switch 1753 may be connected with the fifth antenna 1715 and the sixth antenna 1716 to connect the seventh port of the switch 1740 to the fifth antenna 1715 or the sixth antenna 1716 as per control signals.

The fourth sub switch 1754 may be connected with the seventh antenna 1717 and the eighth antenna 1718 to connect the eighth port of the switch 1740 to the seventh antenna 1717 or the eighth antenna 1718 as per control signals.

Figure 18:
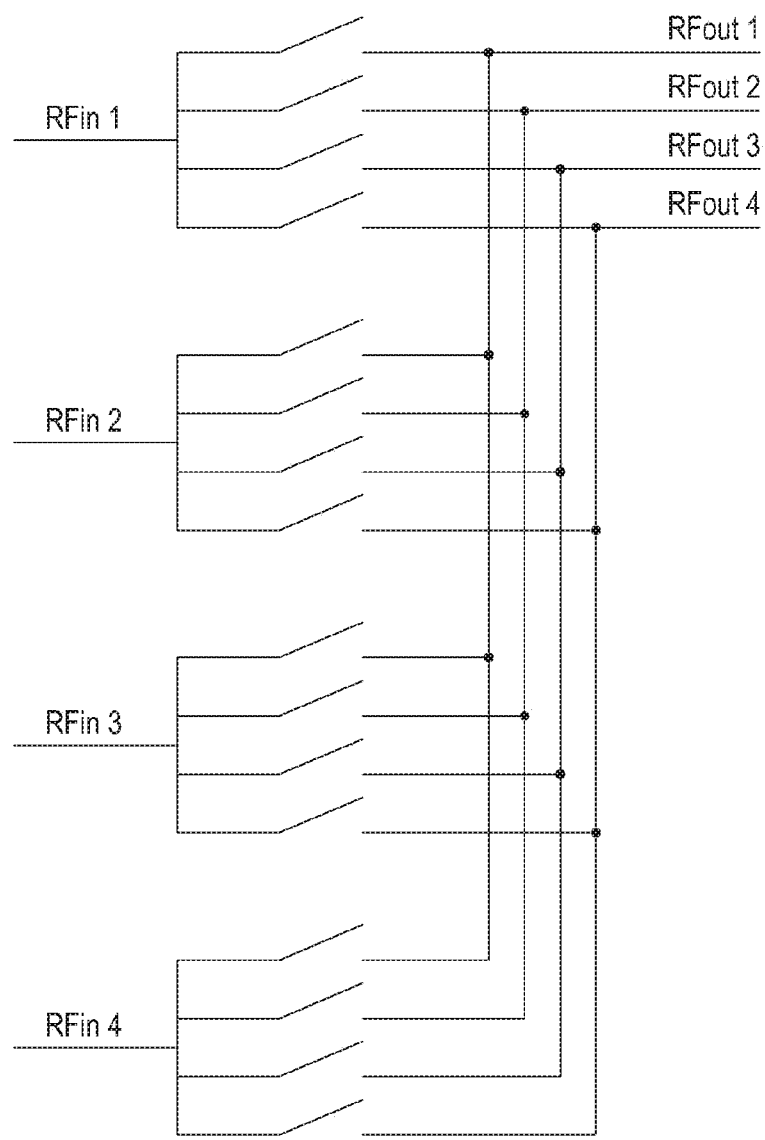
FIG. 18 is a view illustrating a 4P4T switch of an electronic device according to various embodiments.

Meanwhile, the switch 1740 may be, e.g., a 4P4T switch, which may have ports shaped as shown in FIG. 18. The 4T4T switch may be a switch configured to enable all combinations of one-to-one connections between four front ports and four rear ports. For example, the number 1 port (RFin 1) of the 4P4T switch may make connections to all of the number 1 to number 4 rear ports (RFout1, RFout2, RFout3, and RFout4). The number 2 to number 4 front ports (RFin 1, RFin 2, RFin 3, and RFin 4) may also be connected to the rear ports as is the number 1 front port as set forth above. Thus, the 4P4T switch may arbitrarily swap the components (e.g., circuits or antennas) connected with each front port and each rear port.

The switch 1740 and the first sub switch 1751, the second sub switch 1752, the third sub switch 1753, and the fourth sub switch 1754 may swap among the above-described eight antennas through control signals.

The control signals may be produced based on at least one of the received electric field strength and/or reception signal quality of each of the first antenna 1711, the second antenna 1712, the third antenna 1713, the fourth antenna 1714, the fifth antenna 1715, the sixth antenna 1716, the seventh antenna 1717, and the eighth antenna 1718. For example, the electronic device 1700 may measure received electric field strength and/or receive signals every four antennas and measure them by two measurement operations. Upon simultaneously measuring the received electric field strengths and/or reception signals of the four antennas at a time, the electronic device 1700 may do without including adjacent antennas that may influence each other.

The electronic device 1700 may include a first extractor 1761, a second extractor 1762, and a third extractor 1763.

For example, the first extractor 1761 connected with the Wi-Fi module may be connected anywhere between the second sub switch 1752 and the fourth antenna 1714. At this time, the band of the second antenna may correspond to the Wi-Fi band. The first extractor 1761 may extract a signal corresponding to the Wi-Fi module among signals transmitted and received and transfer the signal to the Wi-Fi module.

Further, the first extractor 1763 connected with the Wi-Fi module may be connected anywhere between the second sub switch 1752 and the third antenna 1713. The band of the third antenna 1712 may correspond to the Wi-Fi band. The second extractor 1763 may extract a signal corresponding to the Wi-Fi module among signals transmitted and received and transfer the signal to the Wi-Fi module.

Further, the second extractor 1762 connected with the GPS module may be connected anywhere between the first sub switch 1751 and the first antenna 1711. The band of the first antenna 1711 may correspond to the GPS band. The second extractor 1762 may extract a signal corresponding to the GPS module among signals transmitted and received and transfer the signal to the GPS module.

Meanwhile, the Wi-Fi module and the GPS module might not be influenced by variations in connection path that are caused by the above-described switching operations. In other words, they may play a role in the fixed positions of the antennas. For example, although the first sub switch 1751 is connected with the second antenna 1712, the GPS module may remain in the state of being connected via the second extractor 1762 to the first antenna 1711, able to perform GPS reception operations. According to an embodiment, the antenna end not connected with the switch 1740 may be connected to the load using a 2P2T switch in the first sub switch 1751, and may thereby be terminated.

Figure 19:
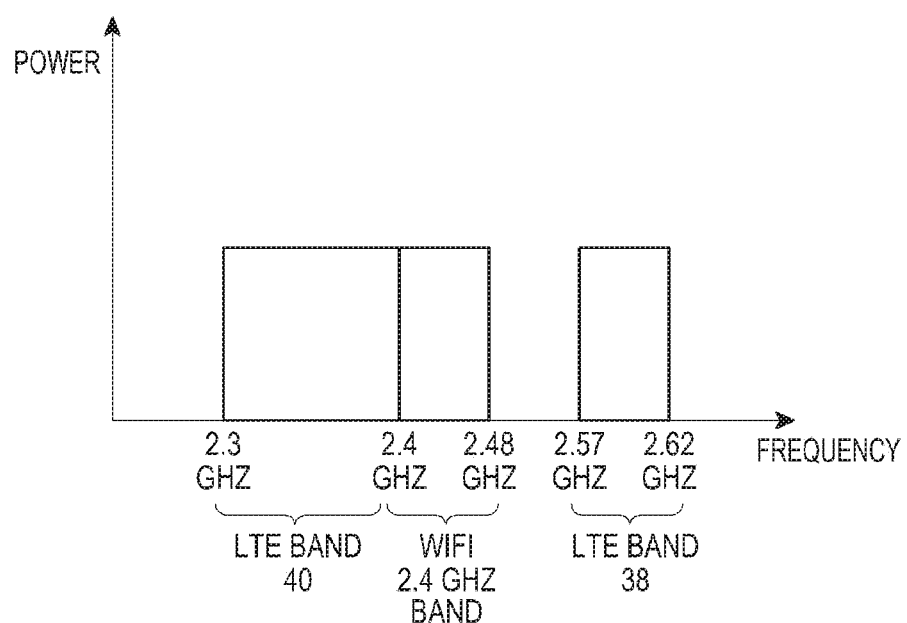
FIG. 19 illustrates bands of an LTE and a Wi-Fi module.

FIG. 19 illustrates bands of an LTE and a Wi-Fi module. An LTE BAND 40 is very close in frequency to the Wi-Fi band (WIFI 2.4 GHZ BAND), causing it difficult to separate signals using an extractor or other passive elements. Accordingly, it is hard to share the LTE BAND 40 and Wi-Fi antennas. However, since the LTE BAND 40 has been assigned for China, and in reality, up to 2.32 GHz only is used, the above-described structure may be put to use.

If the whole LTE BAND 40 is used, a selective connection between the Wi-Fi and LTE BAND 40 antennas is needed. In this case, the switch may be used, with the extractors excluded from the configuration of FIG. 17, to allow the switch or module (GPS module or Wi-Fi module) to make a selective connection to a different antenna.

Figure 20:
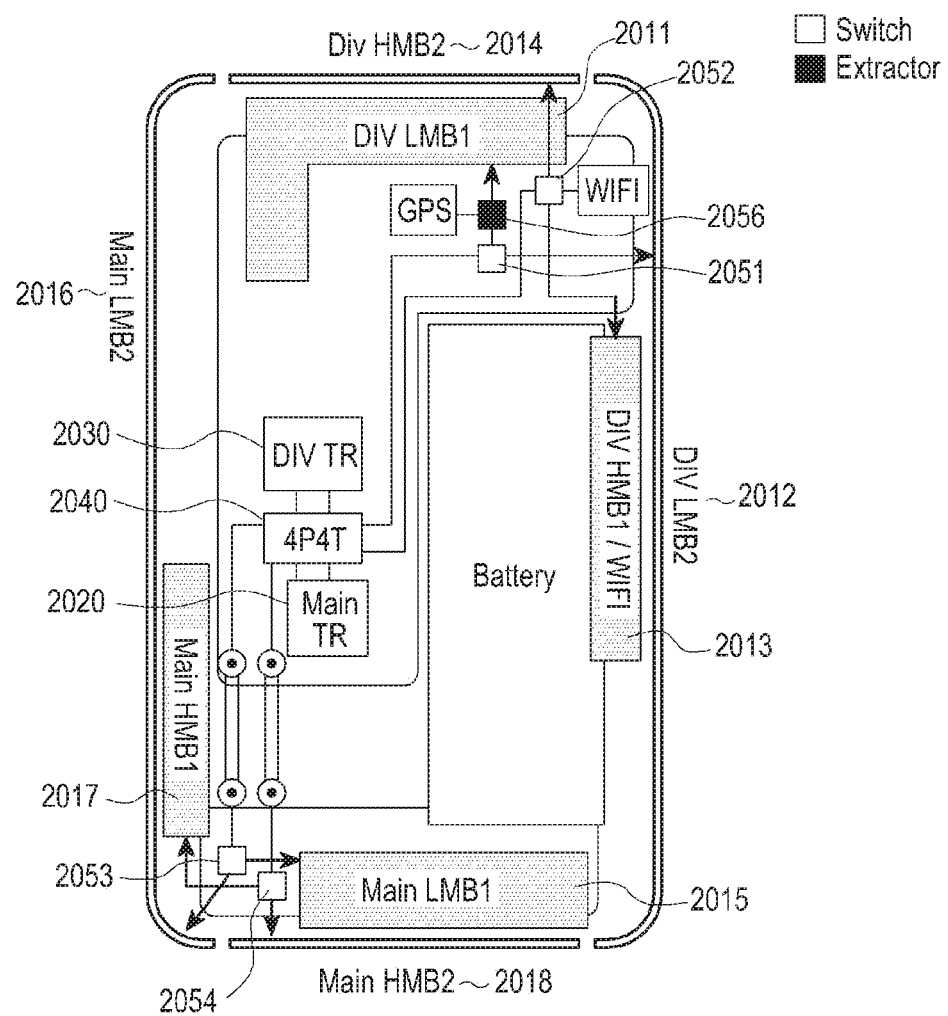
FIG. 20 is a circuit diagram illustrating an electronic device including a plurality of antennas according to various embodiments.

FIG. 20 is a circuit diagram illustrating an electronic device including a plurality of antennas according to various embodiments. Referring to FIG. 20, an electronic device 2000 may include a first antenna 2011, a second antenna 2012, a third antenna 2013, a fourth antenna 2014, a fifth antenna 2015, a sixth antenna 2016, a seventh antenna 2017, and an eighth antenna 2018. Further, the second antenna 2012, the fourth antenna 2014, the sixth antenna 2016, and the eighth antenna 2018 may be part of a metallic bezel (metal housing). For example, the electronic device 2000 may include a metallic bezel. The metallic bezel may include at least one separator, and unit bezel parts into which the bezel is divided by the separator may be utilized as the second antenna 2012, the fourth antenna 2014, the sixth antenna 2016, and the eighth antenna 2018.

Further, the antenna device 2000 may include a main transceiver 2020 and a diversity receiver 2030.

The main transceiver 2020 and the diversity receiver 2030 each may be connected with a switch 2040 (e.g., a 4P4T switch). For example, the main transceiver 2030 may include a first front end 2021 and a second front end 2023. The first front end 2021 may be connected with the first port of the switch 2040, and the second front end 2023 may be connected with the second port of the switch. Further, the diversity receiver 2030 may include a first front end 2031 and a second front end 2033. The first front end 2031 may be connected with the third port of the switch 2040, and the second front end 2033 may be connected with the fourth port of the switch.

The fifth to eighth ports of the switch 2040 may be connected with a first sub switch 2051, a second sub switch 2052, a third sub switch 2053, and a fourth sub switch 2054.

The first sub switch 2051 may be connected with the first antenna 2011 and the second antenna 2012 to connect the fifth port of the switch 2040 to the first antenna 2011 or the second antenna 2012 as per control signals.

The second sub switch 2052 may be connected with the third antenna 2013 and the fourth antenna 2014 to connect the sixth port of the switch 2040 or the Wi-Fi module to the third antenna 2013 or the fourth antenna 2014 as per control signals. The second sub switch 2055 may be a swap switch. For example, if the sixth port of the switch 2040 is connected to the third antenna 2013, the Wi-Fi module may be connected with the fourth antenna 2014, or if the sixth port is connected with the fourth antenna 2014, the Wi-Fi module may be connected with the third antenna 2013.

The third sub switch 2053 may be connected with the fifth antenna 2015 and the sixth antenna 2016 to connect the seventh port of the switch 2040 to the fifth antenna 2015 or the sixth antenna 2016 as per control signals.

The fourth sub switch 2054 may be connected with the seventh antenna 2017 and the eighth antenna 2018 to connect the eighth port of the switch 2040 to the seventh antenna 2017 or the eighth antenna 2018 as per control signals.

The antenna device 2000 may include an extractor 2056. The extractor 2056 connected with the GPS module may be connected anywhere between the first sub switch 2051 and the first antenna 2011.

Meanwhile, the antenna not selected in the electronic device may be left in the state of floating or being connected with the ground, and may be likely to have less influence on its adjacent antennas. Depending on the design, however, the non-selected antenna may operate as a parasitic element (or parasitic resonance), likely affecting the performance of the adjacent antennas. To resolve such problems, the electronic device may be designed as shown in FIG. 21.

Figures 21A, 21B:
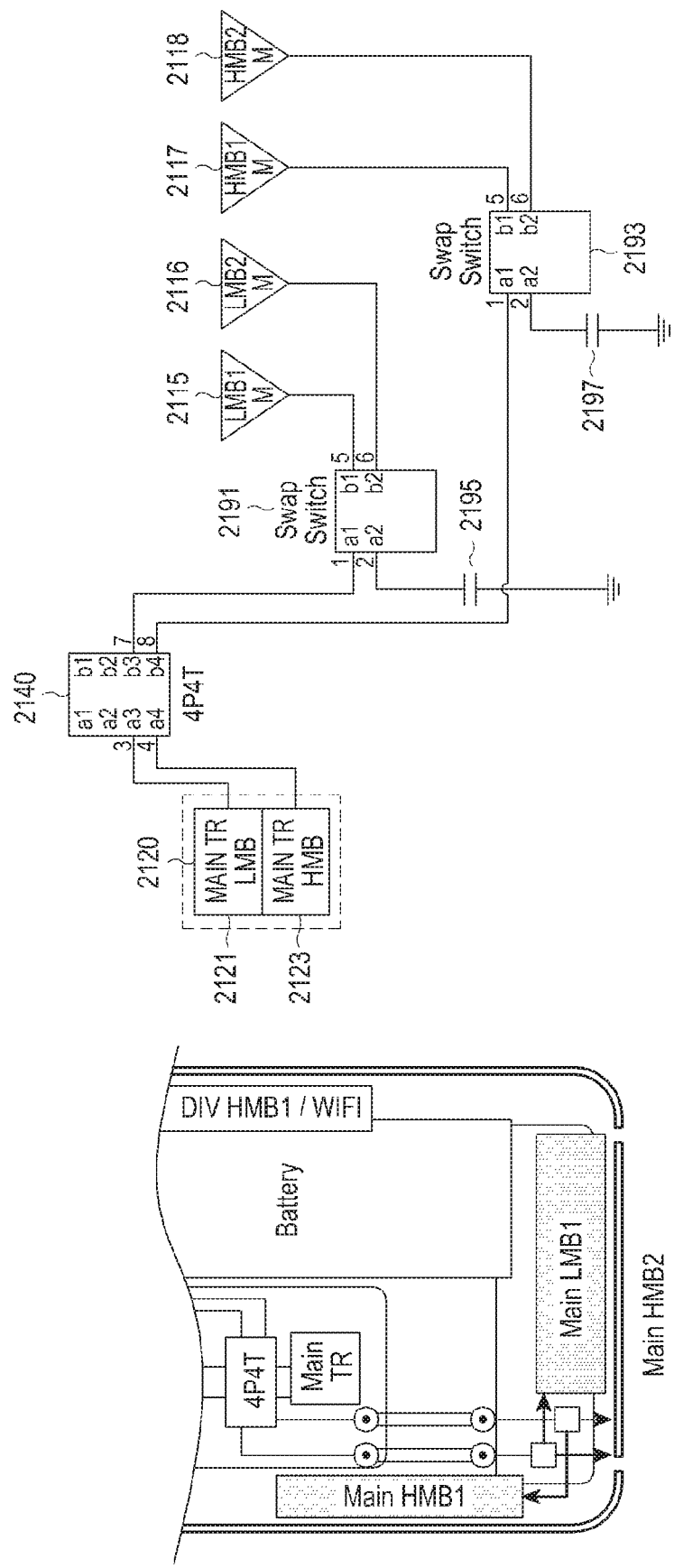
FIG. 21 is a circuit diagram illustrating an electronic device including a plurality of antennas according to various embodiments.

Referring to FIG. 21, an electronic device 2100 may connect antennas 2115 or 2116 and 2117 or 2118 not connected with the switch 2140 among the two antennas 2115 and 2116 and the two antennas 2117 and 2118 connected with the sub switches 2191 and 2193, respectively, to the load (R/L/C or a combined circuit thereof). Thus, the non-selected antenna may be changed into the state of not affecting the performance of its adjacent antennas. For example, where the parasitic resonance of the unused antenna is nearby as shown in FIG. 22(*a*), the unused antenna may be connected to the load, so that the parasitic resonance may be shifted to a frequency band not supported by the antenna or modified as shown in FIG. 22(*b*).

The sub switches 2101 and 2193 may be swap switches.

Meanwhile, where the electronic device 2100 uses the adjacent antennas, the isolation interval may be small, causing a deterioration of performance of the antennas used. For example, where the electronic device 2100 selects the fourth antenna 2115 and the eighth antenna 2118 or the fourth antenna 2116 and the seventh antenna 2117, the selected antennas may cause a coupling since they are positioned adjacent each other, resultantly deteriorating performance. Further, if the performance of antennas of the electronic device 2100 are simultaneously measured with the adjacent antennas excluded as set forth above, the performance of antenna when the adjacent antennas are simultaneously selected cannot be identified. Accordingly, the antenna device 2100 may exclude a combination of the adjacent antennas upon selecting antennas.

Further, the sub switches may be connected with the switch 2140, and the switch 2140 may be connected with the main transceiver 2120. For example, the first front end 2121 and the second front end 2124 of the main transceiver 2120 may be connected with the third port and the fourth port, respectively.

Figure 23:
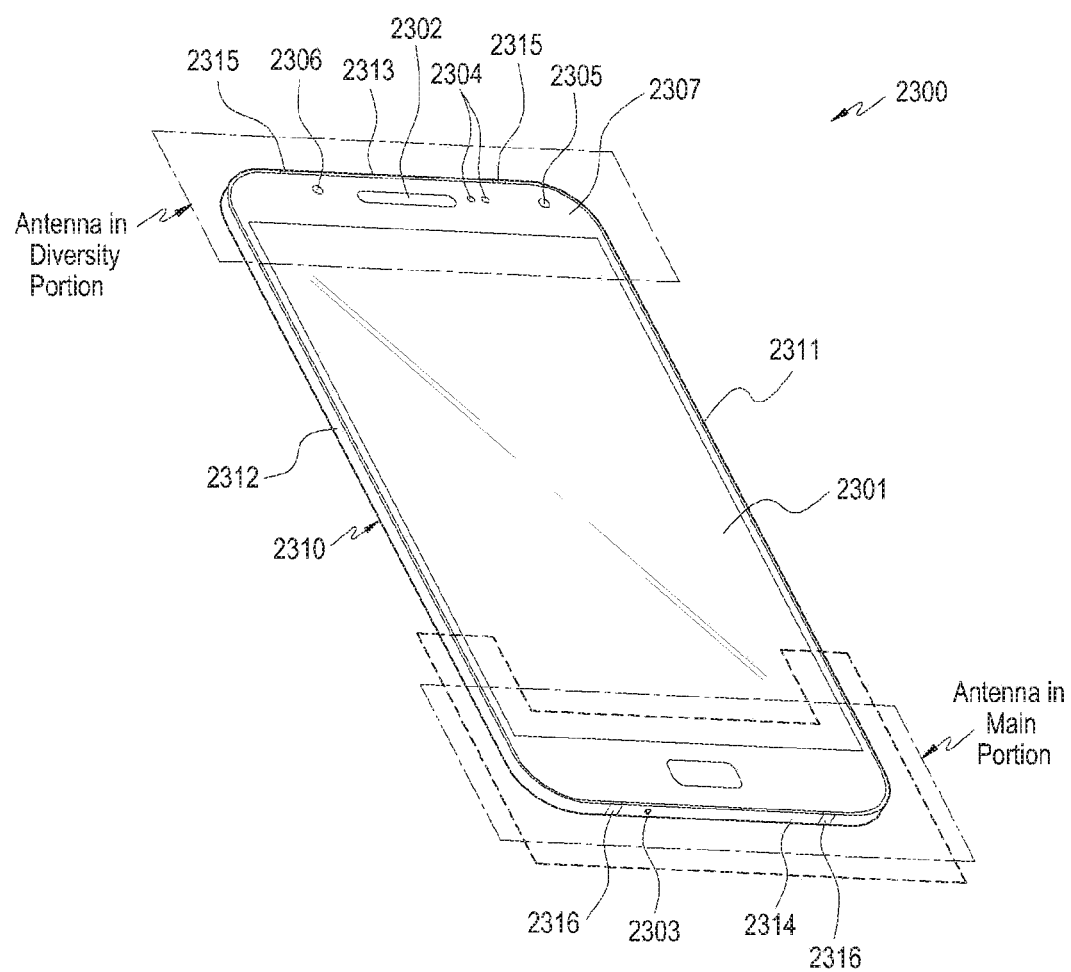
FIG. 23 is a perspective view illustrating an electronic device according to various embodiments.

FIG. 23 is a perspective view illustrating an electronic device 2300 (e.g., the electronic device 101) according to various embodiments.

Referring to FIG. 23, a display 2301 may be installed on the front surface 2307 of the electronic device 2300. A speaker device 2302 may be installed on an upper portion of the display 2301 to receive an opposite party's voice. A microphone device 2303 may be installed on a lower portion of the display 2301 to send a voice of the user of the electronic device to the opposite party.

According to an embodiment, components for performing various functions of the electronic device 2300 may be arranged around the speaker device 2302. The components may include at least one sensor module 2304. The sensor module 2304 may include at least one of, e.g., an illumination sensor (e.g., an optical sensor), a proximity sensor, an infrared (IR) sensor, or an ultrasonic sensor. According to an embodiment, the components may include a camera device 2305. According to an embodiment, the components may include a light emitting diode (LED) indicator 2306 to provide state information about the electronic device 2300 to the user.

According to various embodiments, the electronic device 2300 may include a metal bezel 2310 (which may be provided as at least a portion of a metal housing). According to an embodiment, the metal bezel 2310 may be formed along an edge of the electronic device 2300 and may expand to at least a portion of the rear surface of the electronic device 2300, which extends from the edge. According to an embodiment, the metal bezel 2310 may be defined as a thickness of the electronic device 2300 along the edge of the electronic device 2300 and may be shaped as a loop. However, the metal bezel 2310 is not limited thereto, and the metal bezel 2310 may be formed in such a manner as to at least partially contribute to the thickness of the electronic device 2300. According to an embodiment, the metal bezel 2310 may be formed only in at least a portion of the edge of the electronic device 2300. According to an embodiment, the metal bezel 2310 may include at least one separator 2315 and 2316. According to an embodiment, unit bezel portions separated by the separators 2315 and 2316 may be utilized as antenna radiators operating on at least one frequency band.

According to various embodiments, the metal bezel 2310 may be shaped as a loop along the edge and may be disposed in such a way as to contribute, in whole or part, to the thickness of the electronic device 2300. According to an embodiment, when the electronic device 2300 is viewed from front, the metal bezel 2310 may include a right bezel portion 2311, a left bezel portion 2312, an upper bezel portion 2313, and a lower bezel portion 2314. Here, the lower bezel portion 2314 may be contributed as unit bezel portions formed by a pair of separators 2316.

According to various embodiments, the main antenna may be disposed in a lower portion (main portion antenna area) of the electronic device 2300. According to an embodiment, the lower bezel portion 2314 may be used as a main antenna radiator by the pair of separators 2316. According to an embodiment, the lower bezel portion 2314 may be contributed as an antenna radiator operating on at least two operating frequency bands according to the position of power feeding. For example, the lower bezel portion 2314 may be part of the antenna supporting the low band (LB) and high band and mid band (H/MB) or the high band and mid band (H/MB).

According to various embodiments, the configuration of the electronic device 2300 of the present invention is merely an example, and the above-described functions of the lower bezel portion 2314 may be instead or together performed by the upper bezel portion 2313 separated by another separator 2315. In such case, the diversity antenna area of the upper bezel portion 2313 may be utilized as diversity/multiple-input multiple-output (MIMO) antenna. For example, the upper bezel portion 2314 may be part of the diversity antenna supporting the low band (LB) and high band and mid band (H/MB) or the high band and mid band (H/MB).

According to an embodiment, the right bezel portion 2311 or the left bezel portion 2312 may also be powered to operate as an antenna. For example, the right bezel portion 2311 or left bezel portion 2312 may be part of the antenna supporting the high band and mid band (H/MB) or the low band (LB), the high band and mid band (H/MB). The antenna including the right bezel portion 2311 or the left bezel portion 2312 included in the antenna area of the main portion may be operated as a main antenna. The antenna including the right bezel portion 2311 or the left bezel portion 2312 included in the antenna area of the diversity portion may be operated as a diversity antenna.

Figure 24:
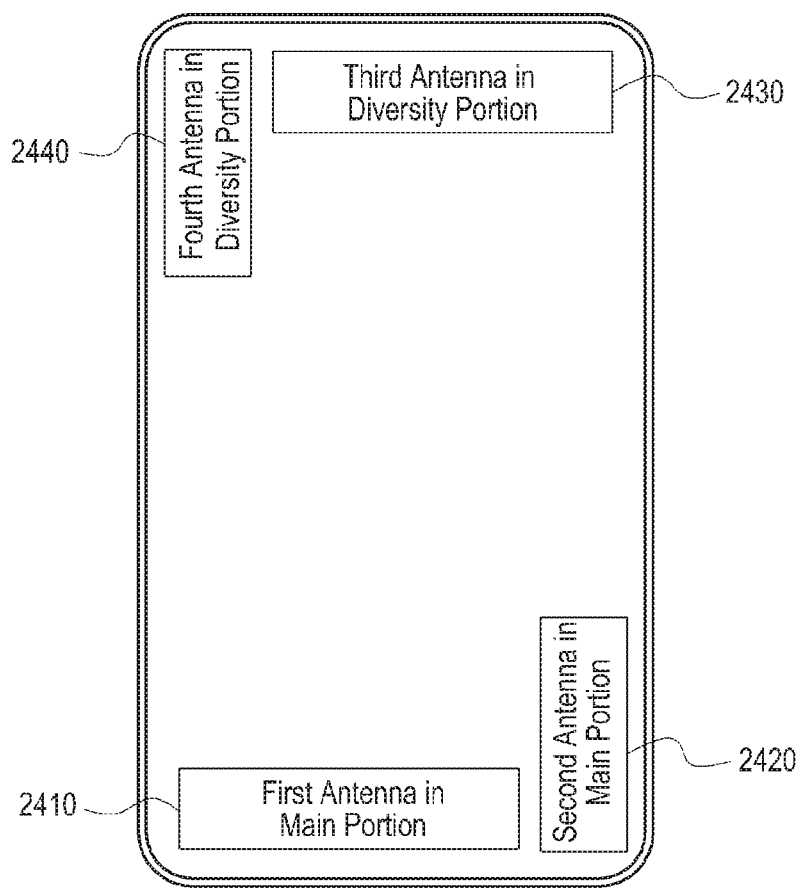
FIG. 24 is a view illustrating an electronic device including a plurality of antennas according to various embodiments.

FIG. 24 is a view illustrating an electronic device 2401 (e.g., the electronic device 101) including a plurality of antennas according to various embodiments.

Referring to FIG. 24, the first antenna 2401 of the electronic device 2401 may support the low band (LB) and the high band and mid band (H/MB), and the second antenna 2420 may support the high band and mid band (H/MB). Here, the reason why only one antenna supports the low band is that the low band is relatively long wavelength, causing the antenna bulky and hence rendering it difficult to add a plurality of low band-supporting antennas in the main portion (main antenna portion) of the electronic device. Although addable, they are positioned close to each other, likely causing correlation/isolation issues. This is why a longer wavelength leads to an increase in the antenna separation distance required for diversity or MIMO operation.

Referring to FIG. 24, the electronic device may add a diversity portion (diversity antenna portion) in which case the third antenna 2430 and the fourth antenna 2440 may be included. To raise correlation/isolation characteristics, in general, the antenna of the main portion is included in the lower portion of the electronic device 2401, and the antenna of the diversity portion is included in the upper portion of the electronic device 2401 as shown in FIG. 24. Therefore, although a plurality of low-band antennas are included, a possible antenna isolation distance may be secured inside the electronic device.

The above-described structure enables reception with four antennas on the high band and mid band (H/MB) and with two antennas on the low band. That is, 4th order diversity/MIMO may be performed on the high band and mid band (H/MB), and 2nd order diversity/MIMO may be performed on the low band (LB).

Figure 25:
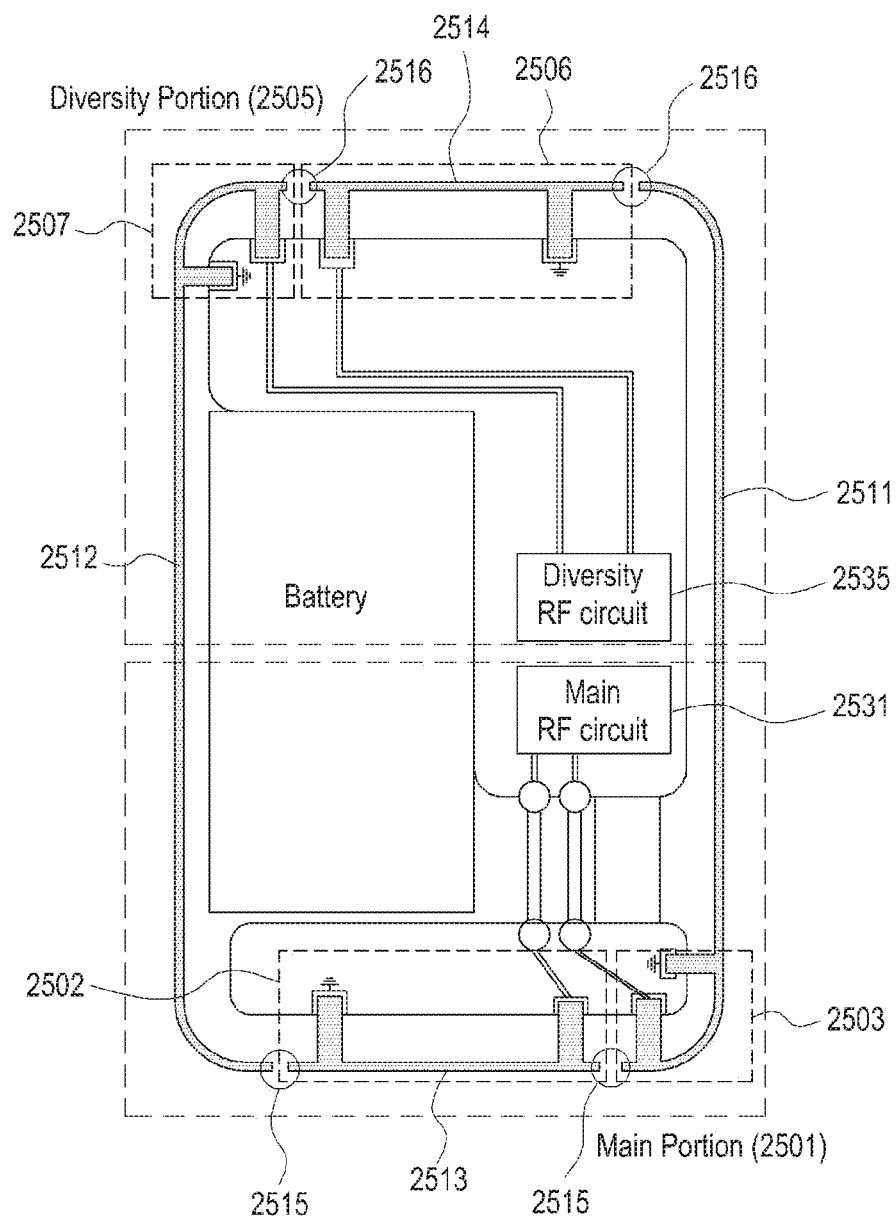
FIG. 25 is a view illustrating a configuration of an electronic device according to various embodiments of the present invention.

FIG. 25 is a view illustrating a configuration of an electronic device according to various embodiments. According to various embodiments, the metal bezel of FIG. 25 may be similar to or different from the metal bezel of FIG. 23.

Referring to FIG. 25, the metal bezel, when viewed from front, may include a right bezel portion 2511, a left bezel portion 2512, a lower bezel portion 2513, and an upper bezel portion 2514. According to an embodiment, the lower bezel portion 2513 may remain separated from the right bezel portion 2511 and the left bezel portion 2512 by a pair of separators 2515 formed at a predetermined interval. The upper bezel portion 2514 may remain separated from the right bezel portion and the left bezel portion by a pair of separators 2516 formed at a predetermined interval. According to an embodiment, the pair of separators 2515 and 2516 may be formed of a dielectric. According to an embodiment, the pair of separators 2515 and 2516 may be formed in such a manner that a synthetic resin is double-injected or double-molded in the metal bezel formed of a metal. However, the pair of separators may adopt other various insulative materials or substances without limited thereto.

According to various embodiments, a predetermined first power feeding piece may integrally be formed with the lower bezel portion 2513, and the first power feeding piece may be powered by a first power feeder of the board (PCB). According to an embodiment, the first powering piece of the lower bezel portion 2513 may be connected to the first power feeder of the board or electrically connected by a separate electrical connecting member (e.g., a C clip) simply by the operation that the board is installed in the electronic device.

According to various embodiments, a first power feeding pad may be disposed on the board, and the first power feeding pad may electrically be connected with the first power feeding piece of the lower bezel portion 2513. According to an embodiment, a first electrical path (e.g., a wiring line) may be formed from the first power feeding pad to the first power feeder. The lower bezel portion 2513 may be part of the first antenna 2502 of the main portion 2501 supporting the low band (LB) and high band and mid band (H/MB) or the high band and mid band (H/MB). The left bezel portion 2512 may be powered in the same manner as the right bezel portion 2511. The left bezel portion 2512 and the right bezel portion 2511 may be part of the second antenna 2503 of the main portion supporting the low band (LB) and high band and mid band (H/MB) or the high band and mid band (H/MB).

According to various embodiments, a first ground piece may integrally be formed with the lower bezel portion 2513 in a position a predetermined distance away from the power feeding piece, and the first ground piece may be grounded to the first ground portion of the board PCB. According to an embodiment, the first ground piece of the lower bezel portion 2513 may be grounded to the first ground portion of the board or electrically connected by a separate electrical connecting member (e.g., a C clip) simply by the operation that the board is installed in the electronic device.

According to various embodiments, a first ground pad may be disposed on the board, and the first ground pad may electrically be connected with the first ground piece of the lower bezel portion 2513. According to an embodiment, a second electrical path (e.g., a wiring line) may be formed from the first ground pad to the first ground portion.

According to various embodiments, a predetermined second power feeding piece may integrally be formed with the lower bezel portion, and the second power feeding piece may be powered by a second power feeder of the board (PCB). According to an embodiment, the second power feeding piece of the right bezel portion 2511 may be connected to the second power feeder of the board or electrically connected by a separate electrical connecting member (e.g., a C clip) simply by the operation that the board is installed in the electronic device.

According to various embodiments, a second power feeding pad may be disposed on the board, and the second power feeding pad may electrically be connected with the second power feeding piece of the right bezel portion 2511. According to an embodiment, a third electrical path (e.g., a wiring line) may be formed from the second power feeding pad to the second power feeder. The right bezel portion 2511 may be part of the second antenna 2503 of the main portion 2501 supporting the low band (LB) and high band and mid band (H/MB) or the high band and mid band (H/MB).

According to various embodiments, a second ground piece may integrally be formed with the right bezel portion 2511 in a position a predetermined distance away from the separator, and the second ground piece may be grounded to the second ground portion of the board PCB. According to an embodiment, the second ground piece of the right bezel portion may be grounded to the second ground portion of the board or electrically connected by a separate electrical connecting member (e.g., a C clip) simply by the operation that the board is installed in the electronic device.

According to various embodiments, a second ground pad may be disposed on the board, and the second ground pad may electrically be connected with the second ground piece of the right bezel portion 2511. According to an embodiment, a fourth electrical path (e.g., a wiring line) may be formed from the second ground pad to the second ground portion.

The power feeding pad and power feeder of the main portion 2501 and the ground portion and ground pad may be disposed on the sub PCB. The RF circuits 2531 and 2535 of the main portion 2501 and the diversity portion 2505 may be disposed on the main PCB. The main PCB and the sub PCB may be connected with each other via an FPCB. The sub PCB may integrally be formed with the FPCB.

The sub PCB may be disposed lower than the main PCB on the vertical line in the terminal Thus, parts included in the sub PCB may be further spaced apart from the antenna. Relatively thick parts, such as USB connector or speaker may be disposed on the sub PCB.

Transmission/reception signals or reception signals of the RF circuit of the main portion may be transferred to the first and second power feeders of the sub PCB via coaxial cables.

According to various embodiments, the transmission/reception signals or reception signals of the RF circuit 2531 of the main portion 2501 may be delivered via the FPCB to the first and second power feeders of the sub PCB.

The diversity portion 2505 may include a third antenna 2506 and a fourth antenna 2507. The third antenna 2506 may include part of the upper bezel portion 2514, and the fourth antenna 2507 may include the left bezel portion 2512 or the right bezel portion 2511.

The third antenna 2506 may support the low band LB and the high band and mid band (H/MB) or the high band and mid band (H/MB), and the fourth antenna 2507 may support the high band and mid band (H/MB) or the low band (LB), the high band and mid band (H/MB). The power feeding pad and power feeder of the diversity portion 2505 and the ground portion and ground pads may be disposed on the main PCB. The electrical paths connecting the power feeder and power feeding pad in the diversity portion 2505 and the electrical paths connecting the ground portion and ground pad may be disposed on the main PCB.

According to various embodiments, when the main portion 2501 uses the right bezel portion 2511 as the second antenna 2503 for inter-antenna signal separation, the diversity portion 2505 may use, as the fourth antenna 2507, the left bezel portion 2512 which is positioned at an opposite side. When the main portion 2501 uses the left bezel portion 2512 as the second antenna 2507, the diversity portion 2505 may use, as the fourth antenna 2503, the right bezel portion 2511 which is positioned at an opposite side.

According to various embodiments, an electronic device may include an antenna module including a first antenna of a first band, a second antenna of a second band partially overlapping the first band, a third antenna of the first band, and a fourth antenna of the second band, a main transceiver including front ends each corresponding to a respective one of a plurality of bands, a diversity receiver including front ends each corresponding to a respective one of the plurality of bands, and a path forming unit configured to form a path to connect any one of the first antenna and the third antenna to the main transceiver and the other to the diversity receiver and to connect any one of the second antenna and the fourth antenna to the main transceiver and the other to the diversity receiver according to a control signal.

The electronic device may further comprise a controller configured to produce the control signal based on at least one of a received electric field strength or reception signal quality of the antenna module.

The path forming unit may include a first switch connecting any one of the first antenna and the second antenna to the main transceiver and the other to the diversity receiver and a third switch connecting any one of the second antenna and the fourth antenna to the main transceiver and the other to the diversity receiver.

The path forming unit may further include a first diplexer having a first port and a second port respectively connected with the second switch and the first front end of the main transceiver and a common port connected with the first switch and the second switch connecting any one of the third switch and the first port to the third front end of the main transceiver and the other to second front end of the main transceiver.

The electronic device may further include a second diplexer including a first port and a second port respectively connected with the first front end of the diversity receiver and the second front end of the diversity receiver and a common port connected with the first switch.

The control signal may include one configured to allow the first switch to connect the first antenna to the common port of the first diplexer and the third antenna to the common port of the second diplexer, allow the third switch to connect to the third front end of the main transceiver and the first port of the first diplexer to connect to the second front end of the main transceiver, and allow the third switch to connect the third antenna to the third front end of the main transceiver and any one point where the third switch is connected and the fourth antenna to the third front end of the diversity receiver.

The control signal may include one configured to allow the first switch to connect the first antenna to the common port of the first diplexer and the third antenna to the common port of the second diplexer, allow the second switch to connect the first port of the first diplexer to the first front end of the main transceiver and the third switch to the second front end of the main transceiver, and allow the third switch to connect the third antenna to the second front end of the main transceiver and any one point where the third switch is connected and the fourth antenna to the third front end of the diversity receiver.

The control signal may include one configured to allow the first switch to connect the first antenna to the common port of the first diplexer and the second antenna to the common port of the second diplexer, allow the second switch to connect the first port of the first diplexer to the third front end of the main transceiver and the third switch to the second front end of the main transceiver, and allow the third switch to connect the fourth antenna to the second front end of the main transceiver and any one point where the third switch is connected and the third antenna to the third front end of the diversity receiver.

The control signal may include one configured to allow the first switch to connect the third antenna to the common port of the first diplexer and the first antenna to the common port of the second diplexer, allow the second switch to connect the third switch to the third front end of the main transceiver and the first port of the first diplexer to the second front end of the main transceiver, and allow the third switch to connect the third antenna to the third front end of the main transceiver and any one point where the third switch is connected and the fourth antenna to the third front end of the diversity receiver.

The control signal may include a signal configured to control the first antenna, the second antenna, the third antenna, and the fourth antenna to receive a signal corresponding to the overlapping band and one of the first antenna, the second antenna, the third antenna, and the fourth antenna to transmit a signal corresponding to the overlapping band.

The control signal may include a signal configured to perform control so that one of the first antenna, the second antenna, the third antenna, and the fourth antenna may transmit a signal corresponding to the overlapping band, and the antennas other than the antenna able to transmit the signal corresponding to the overlapping band among the first antenna, the second antenna, the third antenna, and the fourth antenna receive the signal corresponding to the overlapping band.

According to various embodiments, an electronic device may comprise an antenna module including first to eighth antennas, a main transceiver including a first front end corresponding to a first band and a second front end corresponding to a second band, a diversity receiver including a third front end corresponding to the first band and a fourth front end corresponding to the fourth band, and a main switch configured to connect one selected from among the first front end, the second front end, the third front end, and the fourth front end to each of a first sub switch, a second sub switch, a third sub switch, and a fourth sub switch, wherein the first sub switch, the second sub switch, the third sub switch, and the fourth sub switch are connected to each of two antennas of the same band in the antenna module, allowing one of the two antennas each connected with the first sub switch, the second sub switch, the third sub switch, and the fourth sub switch to selectively connect to the main switch.

The electronic device may further include a first extractor connecting a Wi-Fi module with the first antenna of the antenna module and a second extractor connecting a GPS module with the second antenna of the antenna module.

The antenna of the two antennas each connected with the first sub switch, the second sub switch, the third sub switch, and the fourth sub switch and not connected with the main switch may be connected to a load or to be opened.

According to various embodiments, a method for comprising an electronic device may include measuring the electric field strength of one of a plurality of antennas, comparing the electric field strength with a first reference electric field strength, and controlling the electronic device to perform a diversity reception operation according to a result of the comparison.

The one antenna may be a previously designated antenna. The electronic device may include, if the electric field strength is smaller than the first reference electric field strength, controlling the electronic device to perform a second order diversity reception operation to identify the electric field strength, if the electric field strength identified by performing the second order diversity reception operation is smaller than the second reference electric field strength, controlling the electronic device to perform a third order diversity reception operation to identify the electric field strength, and if the electric field strength identified by performing the third order diversity reception operation is smaller than a third reference electric field strength, controlling the electronic device to perform a fourth order diversity reception operation.

The one antenna may be an antenna performing a transmission operation of a signal. The electronic device may include, if the electric field strength is smaller than the first reference electric field strength, comparing the electric field strength with the second reference electric field strength, if the electric field strength is smaller than the second reference electric field strength, comparing the electric field strength with the third reference electric field strength, and if the electric field strength is smaller than the third reference electric field strength, and controlling the electronic device to perform the fourth order diversity reception operation.

The electronic device may include, if the electric field strength is the first reference electric field strength or more, controlling the designated antenna to perform a signal reception operation, if the electric field strength is the second reference electric field strength or more, controlling the electric field strength to perform the second order diversity reception operation, and if the electric field strength is the third reference electric field strength or more, controlling the electronic device to perform the third order diversity reception operation.

According to various embodiments, a method for controlling an electronic device may include comparing performances of a plurality of antennas using a pre-measured offset and received electric field of each of a plurality of antennas and determining one antenna performing signal transmission.

The electronic device may further include identifying the transmit power of the electronic device. The electronic device may compare the performances of the plurality of antennas if the transmit power reaches a designated reference value or when a command to increase the transmit power is identified while the transmit power reaches the designated reference value.

The received electric field information may include an RSSI, RSRP, or RSRQ.

The determined antenna may further perform signal reception.

According to various embodiments, an electronic device may comprise a first antenna of a first band, a second antenna of a second band partially overlapping the first band, a third antenna of the first band, and a fourth antenna of the second band, an ambient conductive member connected to a surrounding of a housing, a transmission/reception path corresponding to each of a plurality of bands, a reception path corresponding to each of the plurality of bands, and a path forming unit configured to form a path to connect any one of the first antenna and the third antenna to the transmission/reception path, the other of the first antenna and the third antenna to the reception path, any one of the second antenna and the fourth antenna to the transmission/reception path, and the other of the second antenna and the fourth antenna to the reception path. At least one of the first antenna, the second antenna, the third antenna, or the fourth antenna may include at least part of the ambient conductive member.

For example, the electronic device may further comprise a controller configured to control the path forming unit to produce a control signal to form the path based on at least one of a received electric field strength or a reception signal quality of a signal received from an antenna module including the first antenna, the second antenna, the third antenna, and the fourth antenna.

For example, the path forming unit may include a first switch configured to connect any one of the first antenna and the third antenna to a first front end, a second front end, or a third front end of the transmission/reception path and the other of the first antenna and the third antenna to a first front end or a second front end of the reception path and a third switch configured to connect any one of the second antenna and the fourth antenna to the second front end or the third front end of the transmission/reception path and the other of the second antenna and the fourth antenna to a third front end of the reception path.

For example, the path forming unit may include a first diplexer including a first port and a second port respectively connected with a second switch and the first front end of the transmission/reception path and a common port connected with the first switch, a second switch configured to connect any one of the third switch and the first port to the third front end of the transmission/reception path and the other of the third switch and the first port to the second front end of the transmission/reception path, and a second diplexer including a first port and a second port respectively connected with the first front end of the reception path and the second front end of the reception path and a common port connected with the first switch.

For example, the control signal may be configured to allow the first switch to connect the first antenna to the common port of the first diplexer and the third antenna to the common port of the second diplexer, allow the third switch to connect to the third front end of the transmission/reception path and the first port of the first diplexer to connect to the second front end of the transmission/reception path, and allow the third switch to connect the third antenna to the third front end of the transmission/reception path and any one point where the third switch is connected and the fourth antenna to the third front end of the reception path.

The control signal may be configured to allow the first switch to connect the first antenna to the common port of the first diplexer and the third antenna to the common port of the second diplexer, allow the second switch to connect the first port of the first diplexer to the first front end of the transmission/reception path and the third switch to the second front end of the transmission/reception path, and allow the third switch to connect the third antenna to the second front end of the transmission/reception path and any one point where the third switch is connected and the fourth antenna to the third front end of the diversity receiver.

The control signal may be configured to allow the first switch to connect the first antenna to the common port of the first diplexer and the second antenna to the common port of the second diplexer, allow the second switch to connect the first port of the first diplexer to the third front end of the transmission/reception path and the third switch to the second front end of the transmission/reception path, and allow the third switch to connect the fourth antenna to the second front end of the transmission/reception path and any one point where the third switch is connected and the third antenna to the third front end of the reception path.

The control signal may be configured to allow the first switch to connect the third antenna to the common port of the first diplexer and the first antenna to the common port of the second diplexer, allow the second switch to connect the third switch to the third front end of the transmission/ reception path and the first port of the first diplexer to the second front end of the transmission/reception path, and allow the third switch to connect the third antenna to the third front end of the transmission/reception path and any one point where the third switch is connected and the fourth antenna to the third front end of the reception path.

For example, the control signal may include a signal configured to control the first antenna, the second antenna, the third antenna, and the fourth antenna to receive a signal corresponding to the overlapping band and one of the first antenna, the second antenna, the third antenna, and the fourth antenna to transmit a signal corresponding to the overlapping band.

For example, in the electronic device, while transmission and reception are performed by at least one of the first antenna, the second antenna, the third antenna, and the fourth antenna, and reception is performed by at least one other thereof, when transmit power is a first threshold or more or a received electric field is a second threshold or less, one antenna may perform transmission only, and at least one other antenna may perform reception.

According to various embodiments, an electronic device may comprise an antenna module including first to eighth antennas, an ambient conductive member connected to a surrounding of a housing, a transmission/reception path including a first front end corresponding to a first band and a second front end corresponding to a second band, a reception path including a third front end corresponding to the first band and a fourth front end corresponding to the fourth band, and a main switch configured to connect one selected from among the first front end, the second front end, the third front end, and the fourth front end to each of a first sub switch, a second sub switch, a third sub switch, and a fourth sub switch. At least one of the first to eight antennas may include at least part of an ambient conductive member. The first sub switch, the second sub switch, the third sub switch, and the fourth sub switch are connected to each of two antennas of the same band in the antenna module, allowing one of the two antennas each connected with the first sub switch, the second sub switch, the third sub switch, and the fourth sub switch to selectively connect to the main switch.

For example, the electronic device may further comprise an extractor configured to connect a communication module of a wireless communication scheme different from a wireless communication scheme corresponding to the transmission/reception path or the reception path to one of the antennas of the antenna module or a switch configured to selectively connect a first antenna and a second antenna of the antenna module to the transmission/reception path or the reception path and the communication module.

For example, the electronic device may be configured to open or connect, to a load, the antenna of the two antennas each connected with the first sub switch, the second sub switch, the third sub switch, and the fourth sub switch and not connected with the main switch.

According to various embodiments, a method for controlling an electronic device including an ambient conductive member connected to a surrounding of a housing and a plurality of antennas, at least one of the plurality of antennas including at least part of the ambient conductive member may comprise receiving a signal received through one or more of the plurality of antennas, performing a diversity operation upon receiving the signal through two or more of the plurality of antennas, measuring an electric field strength of the received signal, comparing the electric field strength with a threshold, and adding a reception antenna or maintaining the number of reception antennas according to the comparison. The signal received through the one or more of the plurality of antennas may be a signal of a frequency band jointly supported by the plurality of antennas.

For example, in the one or more antennas, there may be included performing a signal transmission operation, if the electric field strength is smaller than the first reference electric field strength, comparing the electric field strength with a second reference electric field strength, if the electric field strength is smaller than the second reference electric field strength, comparing the electric field strength with a third reference electric field strength, if the electric field strength is smaller than the third reference electric field strength, controlling the electric field strength to perform a fourth order diversity reception operation, if the electric field strength is the first reference electric field strength or more, controlling a designated antenna to perform a signal reception operation, if the electric field strength is the second reference electric field strength or more, controlling the electric field strength to perform a second order diversity reception operation, and if the electric field strength is the third reference electric field strength or more, controlling the electric field strength to perform a third order diversity reception operation.

According to various embodiments, a method for controlling an electronic device may comprise identifying a transmit power of the electronic device, if the transmit power reaches a designated reference value or a command to increase the transmit power is identified while the transmit power reaches the designated reference value, comparing performances of the plurality of antennas using a previously measured offset and a received electric field of each of the plurality of antennas, and determining one antenna to perform transmission of a signal according to a result of the comparison. The term "connection" as used herein may mean an electrical connection.

The term 'module' as used herein may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to various embodiments, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the technology set forth herein. Accordingly, the scope of the present disclosure should be interpreted as including all changes or various embodiments based on the technical spirit of the present disclosure.

The invention claimed is:

1. An electronic device, comprising:
a first antenna of a first band, a second antenna of a second band partially overlapping the first band, a third antenna of the first band, and a fourth antenna of the second band;
an ambient conductive member connected to a surrounding of a housing;
a transmission/reception path corresponding to each of a plurality of bands;
a reception path corresponding to each of the plurality of bands; and
a path forming unit
configured to form a path to connect any one of the first antenna and the third antenna to the transmission/reception path, the other of the first antenna and the third antenna to the reception path, any one of the second antenna and the fourth antenna to the transmission/reception path, and the other of the second antenna and the fourth antenna to the reception path,
wherein at least one of the first antenna, the second antenna, the third antenna, or the fourth antenna includes at least part of the ambient conductive member, and
wherein the path forming unit includes a first switch configured to connect any one of the first antenna and the third antenna to a first front end, a second front end, or a third front end of the transmission/reception path and the other of the first antenna and the third antenna to a first front end or a second front end of the reception path and a third switch configured to connect any one of the second antenna and the fourth antenna to the second front end or the third front end of the transmission/reception path and the other of the second antenna and the fourth antenna to a third front end of the reception path, and
wherein the path forming unit includes a first diplexer including a first port and a second port respectively connected with a second switch and the first front end of the transmission/reception path and a common port connected with the first switch, the second switch configured to connect any one of the third switch and the first port to the third front end of the transmission/reception path and the other of the third switch and the first port to the second front end of the transmission/reception path, and a second diplexer including a first port and a second port respectively connected with the first front end of the reception path and the second front end of the reception path and a common port connected with the first switch.

2. The electronic device of claim 1, further comprising a controller configured to control the path forming unit to produce a control signal to form the path based on a received electric field strength of a signal received from an antenna module including the first antenna, the second antenna, the third antenna, and the fourth antenna.

3. The electronic device of claim 2, wherein the control signal is configured to allow the first switch to connect the first antenna to the common port of the first diplexer and the third antenna to the common port of the second diplexer, allow the third switch to connect to the third front end of the transmission/reception path and the first port of the first diplexer to connect to the second front end of the transmission/reception path, and allow the third switch to connect the third antenna to the third front end of the transmission/reception path and any one point where the third switch is connected and the fourth antenna to the third front end of the reception path.

4. The electronic device of claim 2, wherein the control signal is configured to allow the first switch to connect the first antenna to the common port of the first diplexer and the third antenna to the common port of the second diplexer, allow the second switch to connect the first port of the first diplexer to the first front end of the transmission/reception path and the third switch to the second front end of the transmission/reception path, and allow the third switch to connect the third antenna to the second front end of the transmission/reception path and any one point where the third switch is connected and the fourth antenna to the third front end of the diversity receiver.

5. The electronic device of claim 2, wherein the control signal is configured to allow the first switch to connect the first antenna to the common port of the first diplexer and the second antenna to the common port of the second diplexer, allow the second switch to connect the first port of the first diplexer to the third front end of the transmission/reception path and the third switch to the second front end of the transmission/reception path, and allow the third switch to connect the fourth antenna to the second front end of the transmission/reception path and any one point where the third switch is connected and the third antenna to the third front end of the reception path.

6. The electronic device of claim 2, wherein the control signal is configured to allow the first switch to connect the third antenna to the common port of the first diplexer and the first antenna to the common port of the second diplexer, allow the second switch to connect the third switch to the third front end of the transmission/reception path and the first port of the first diplexer to the second front end of the transmission/reception path, and allow the third switch to connect the third antenna to the third front end of the transmission/reception path and any one point where the third switch is connected and the fourth antenna to the third front end of the reception path.

7. The electronic device of claim 2, wherein the control signal includes a signal configured to control the first antenna, the second antenna, the third antenna, and the fourth antenna to receive a signal corresponding to the overlapping band and one of the first antenna, the second antenna, the third antenna, and the fourth antenna to transmit a signal corresponding to the overlapping band.

8. The electronic device of claim 2, wherein while transmission and reception are performed via the transmission/reception path by at least one of the first antenna, the second antenna, the third antenna, or the fourth antenna, and reception is performed via the reception path by at least one other thereof, when transmit power is a first threshold or more or a received electric field is a second threshold or less, one antenna is configured to perform transmission only, and at least one other antenna is configured to perform reception only.

* * * * *